(12) United States Patent
Song et al.

(10) Patent No.: US 10,130,937 B2
(45) Date of Patent: Nov. 20, 2018

(54) PREPARATION METHOD FOR ROD-SHAPED MOLYBDENUM OXIDE AND PREPARATION METHOD FOR MOLYBDENUM OXIDE COMPOSITE

(71) Applicant: LG CHEM, LTD., Seoul (KR)

(72) Inventors: Cheolock Song, Daejeon (KR); Gyo Hyun Hwang, Daejeon (KR); Ara Cho, Daejeon (KR); Jungup Bang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/328,991

(22) PCT Filed: Aug. 28, 2015

(86) PCT No.: PCT/KR2015/009072
§ 371 (c)(1),
(2) Date: Jan. 25, 2017

(87) PCT Pub. No.: WO2016/032284
PCT Pub. Date: Mar. 3, 2016

(65) Prior Publication Data
US 2017/0216819 A1 Aug. 3, 2017

(30) Foreign Application Priority Data

Aug. 29, 2014 (KR) .................... 10-2014-0114481
Oct. 1, 2014 (KR) .................... 10-2014-0132698

(51) Int. Cl.
*B01J 23/31* (2006.01)
*B01J 37/10* (2006.01)
(Continued)

(52) U.S. Cl.
CPC .............. *B01J 23/31* (2013.01); *B01J 23/28* (2013.01); *B01J 35/0006* (2013.01);
(Continued)

(58) Field of Classification Search
None
See application file for complete search history.

(56) References Cited

U.S. PATENT DOCUMENTS

2009/0088594 A1   4/2009   Oh et al.

FOREIGN PATENT DOCUMENTS

CN    1762831 A    4/2006
CN    101412541 A   4/2009
(Continued)

OTHER PUBLICATIONS

"Hydrothermal synthesis and electrochemical properties of MoO3 nanbelts used as cathode materials for Li0ion batteries" by Anukorn Phuruangrat et al. Applied Physics A (2012) 107: 249-254.*
(Continued)

*Primary Examiner* — Melvin C. Mayes
*Assistant Examiner* — Colette B Nguyen
(74) *Attorney, Agent, or Firm* — Dentons US LLP

(57) ABSTRACT

The present specification relates to a preparation method for rod-shaped molybdenum oxide and a preparation method for a molybdenum oxide composite, the preparation method for rod-shaped molybdenum oxide according to the present invention may be carried out under low temperature and pressure conditions, and thus has an advantage in that it is possible to mass produce rod-shaped molybdenum oxide, and the preparation method for a molybdenum oxide composite according to the present invention has an advantage in that the molybdenum oxide composite may be synthesized at a temperature which is equal to or less than the boiling point of ethanol, and the amount of an ethanol solvent used is reduced.

17 Claims, 15 Drawing Sheets

(51) Int. Cl.
| | |
|---|---|
| *B01J 23/28* | (2006.01) |
| *C01G 29/00* | (2006.01) |
| *C01G 39/02* | (2006.01) |
| *B01J 35/00* | (2006.01) |
| *B01J 35/02* | (2006.01) |
| *B01J 37/02* | (2006.01) |

(52) U.S. Cl.
CPC ......... *B01J 35/026* (2013.01); *B01J 37/0221* (2013.01); *B01J 37/10* (2013.01); *C01G 29/00* (2013.01); *C01G 39/02* (2013.01); *C01P 2002/72* (2013.01); *C01P 2004/03* (2013.01)

(56) References Cited

FOREIGN PATENT DOCUMENTS

| | | |
|---|---|---|
| CN | 103663559 A | 3/2014 |
| KR | 10-2007-0103219 A | 10/2007 |
| KR | 10-2012-0136350 A | 12/2012 |

OTHER PUBLICATIONS

"Preparation of materials in the presence of hydrogen peroxide: from discrete or "zero-dimensional" objects to bulk materials" by Jean-Yves Piquemal et al. The Royal Society of CHemistry 2013.*

"The synthesis of MnO2 nanrods using hydrothermal homoegeneous precipitation". by Aye aye Hlaing et al. Advnaces in Natural Science, Nanoscience and Nanotechnology 3 (2012) (025001 (3pp).*

Phuruangrat, et al., "Hydrothermal synthesis and electrochemical properties of α-MoO3 nanobelts used as cathode materials for Li-ion batteries" Applied Physics A, 2012, vol. 107, pp. 249-254.

Shakir, et al., "Structural and electrochemical characterization of α-MoO3 nanorod-based electrochemical energy storage devices" Electrochim ACTA 2010, 56, 376-380.

Krishnan, et al., "Spatiotemporal Oscillations in Peroxo-Molybdate Complexes in Acidic Solutions:" Int. J. Electrochem. Sci., 2007, vol. 2, 444-461.

Fang, et al., "Green Synthesis and Characterization of Anisotropic Uniform Single-Crystal α-MoO3 Nanostructures" J. Phys. Chem. C., 2007, 111, 2401-2408.

Zollfrank, et al., "Antimicrobial activity of transition metal acid α-MoO3 prevents microbial growth on material surfaces" Materials Science and Engineering C., 2012, 32, 47-54.

Wang, et al., "Mesostructural Bi—Mo—O catalyst: correct structure leading to high performance" Scientific Reports, 3: 2881.

Song, et al., "Hydrophilic Molybdenum Oxide Nanomaterials with Controlled Morphology and Strong Plasmonic Absorption for Photothermal Ablation of Cancer Cells" ACS Applied Materials & Interfaces, 2014, 6, 3915-3922.

* cited by examiner

[Figure 1]
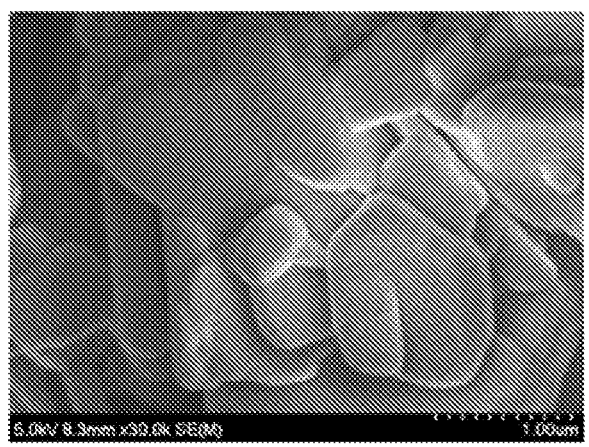
(a)
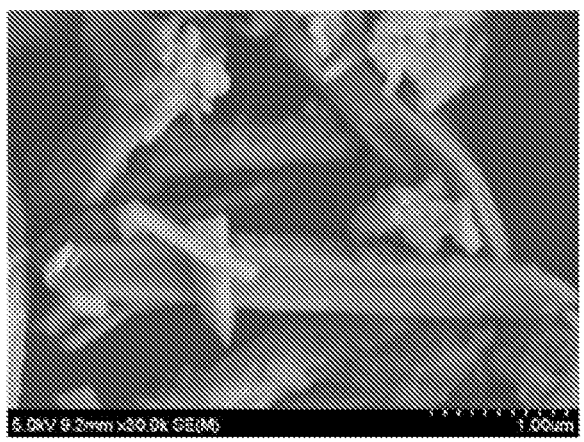
(b)
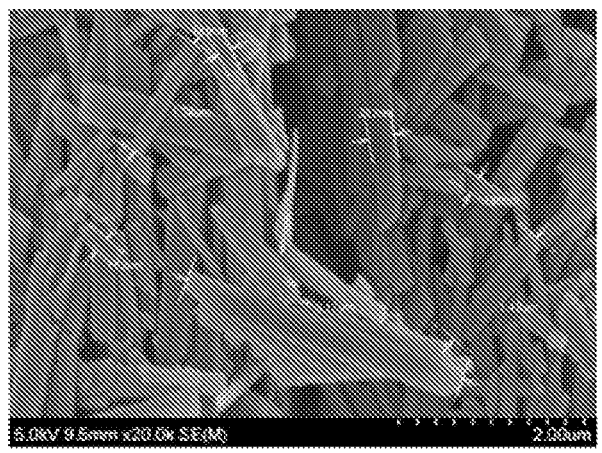
(c)

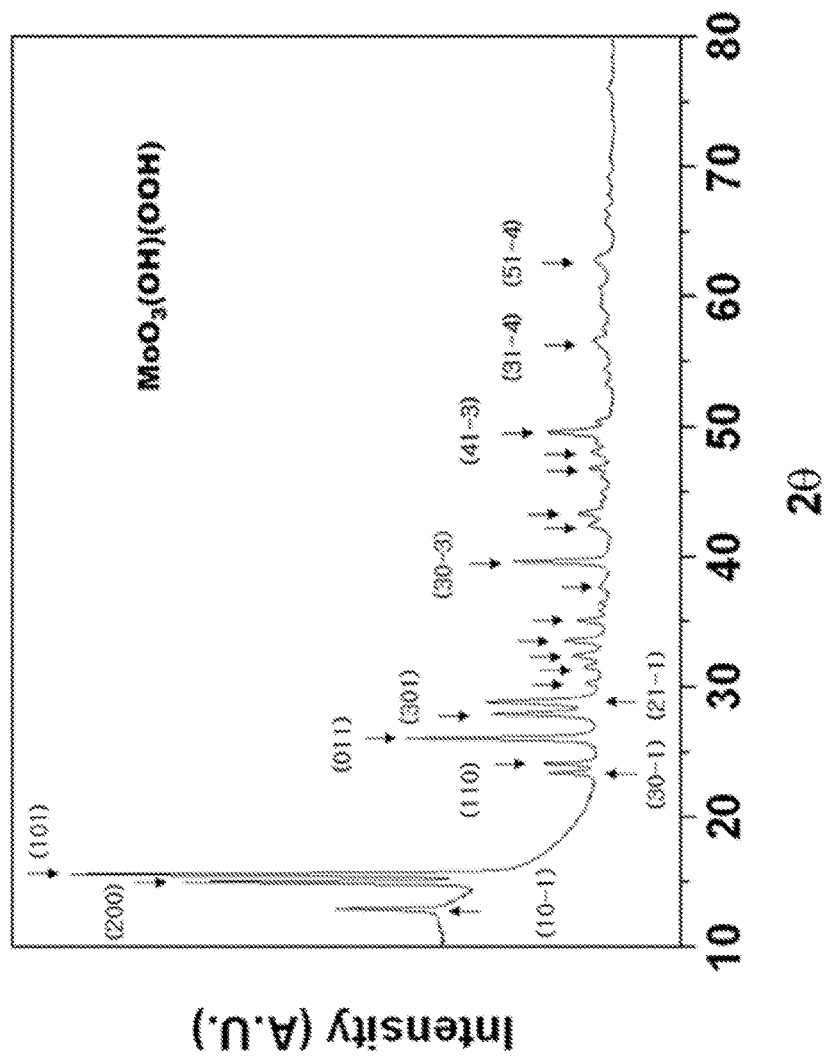
[Figure 2]

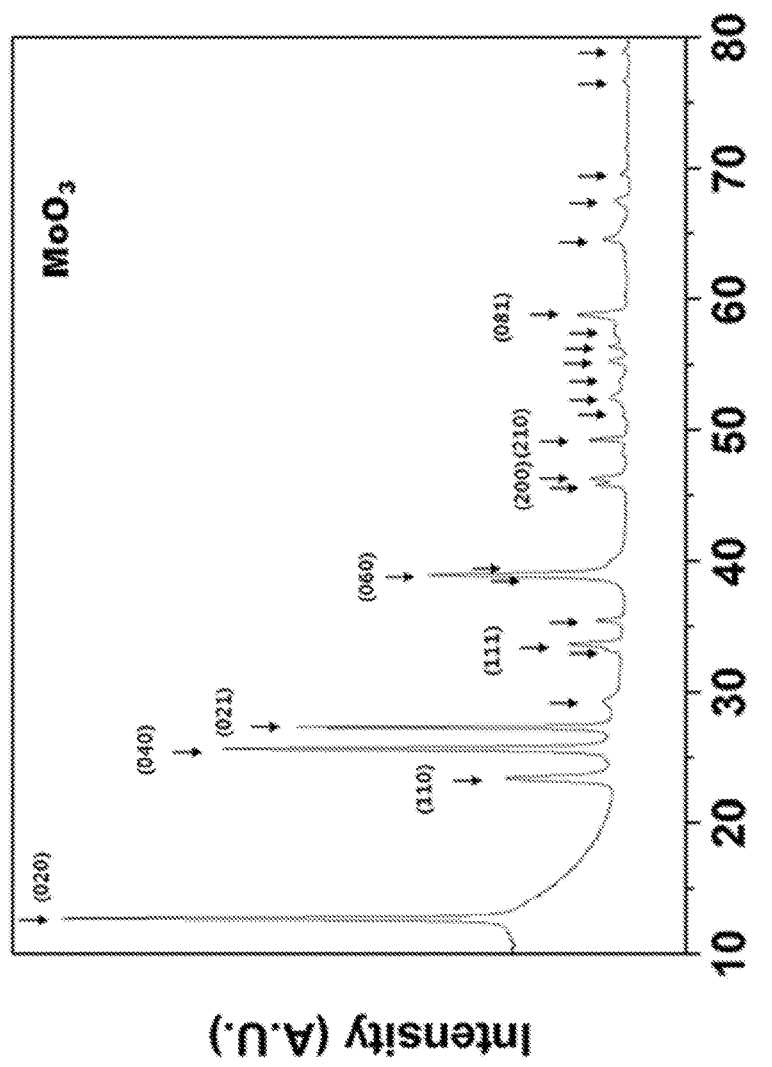
[Figure 3]

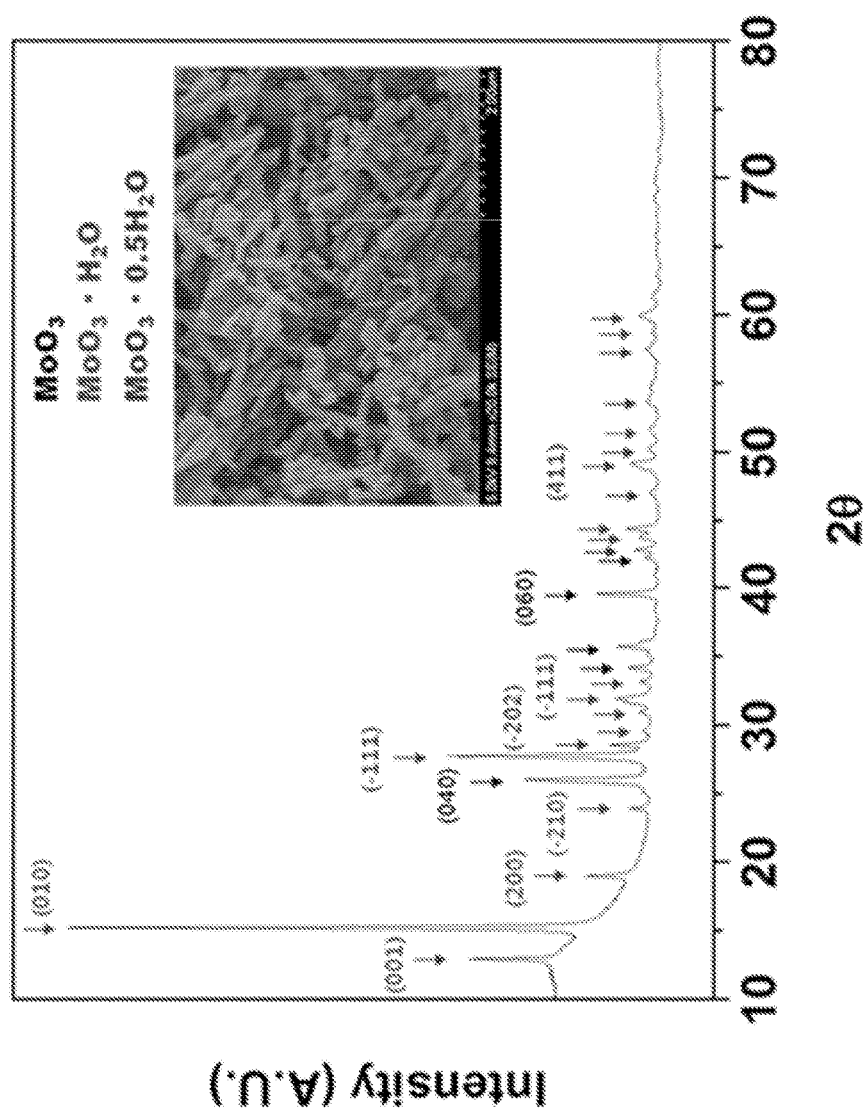
[Figure 4]

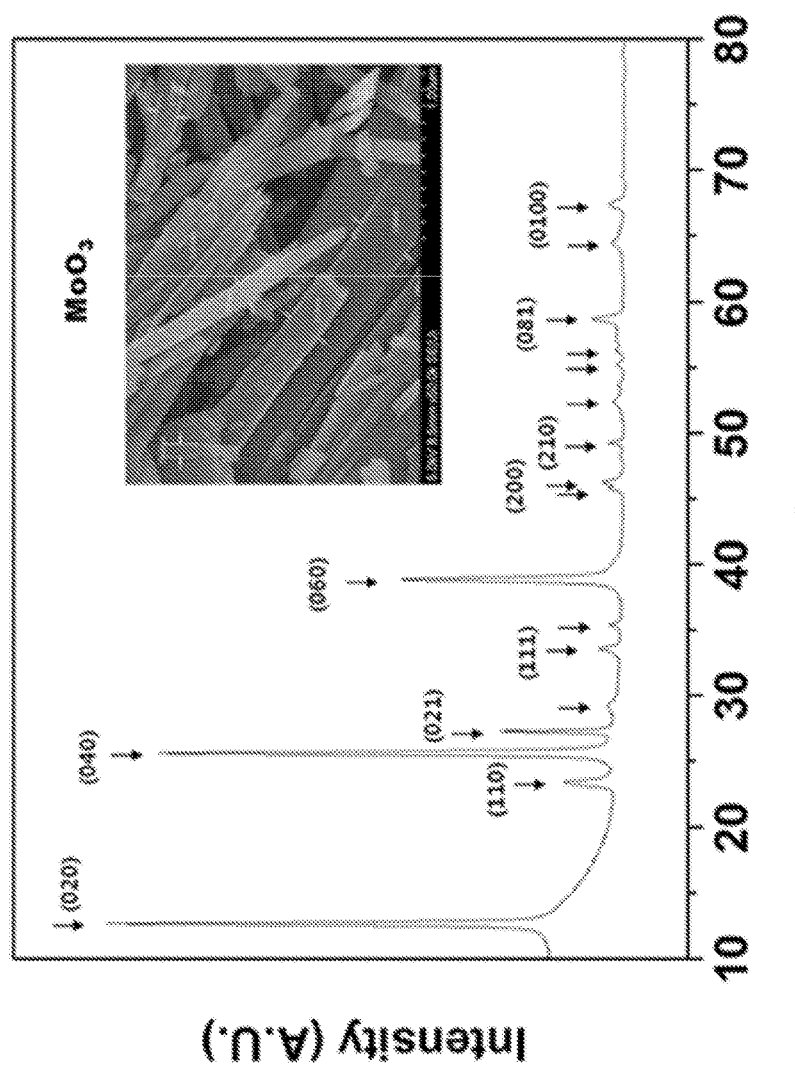
[Figure 5]

[Figure 6]
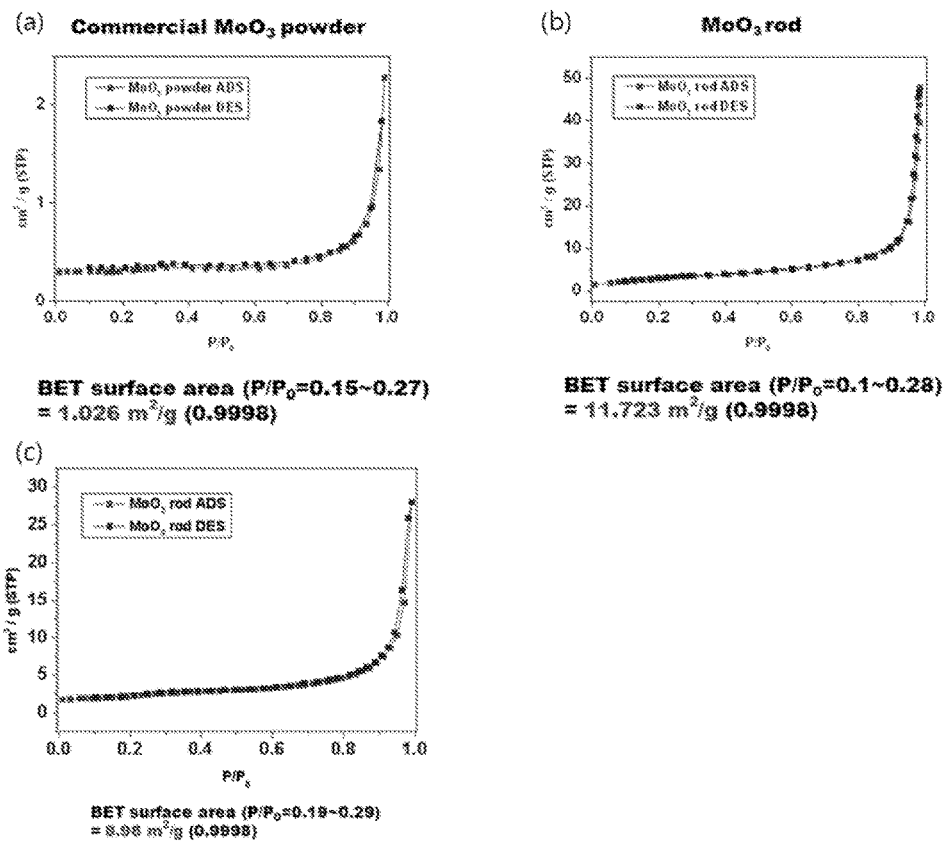

[Figure 7]
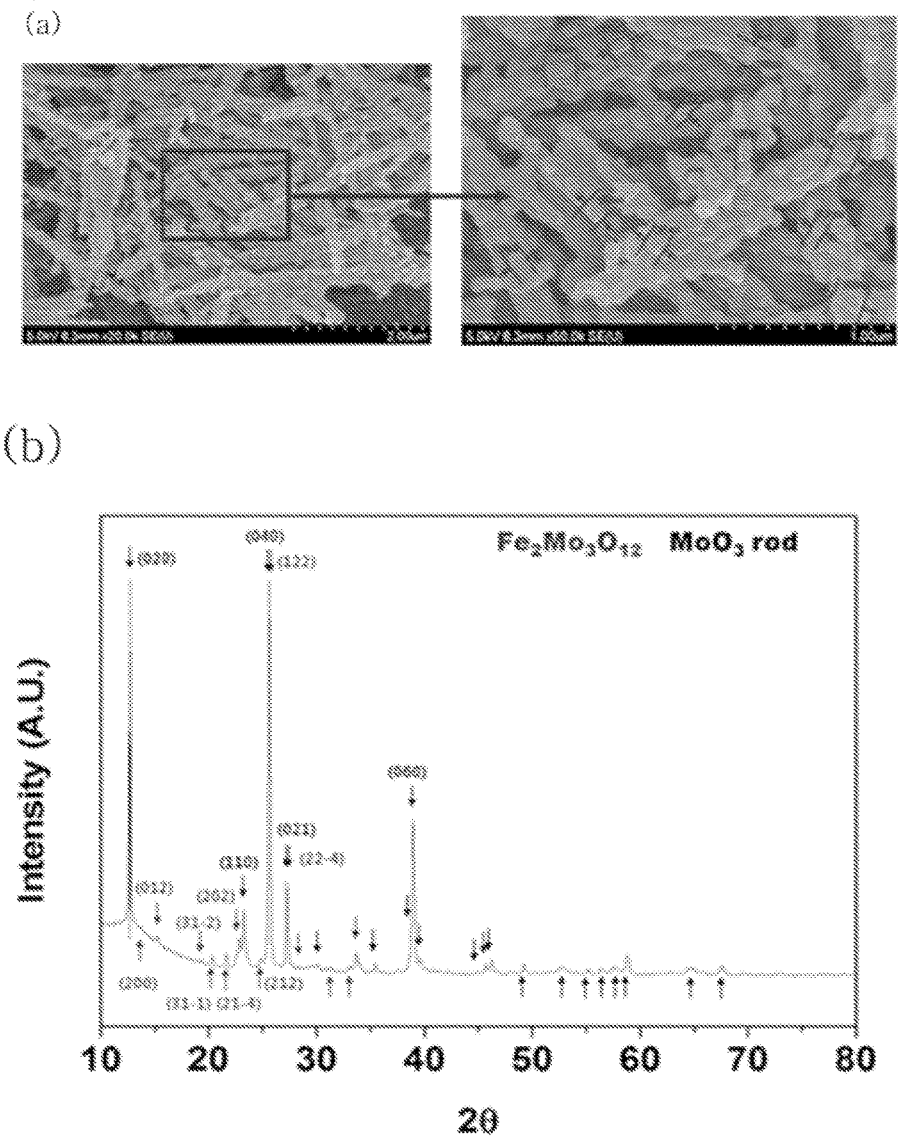

[Figure 8]
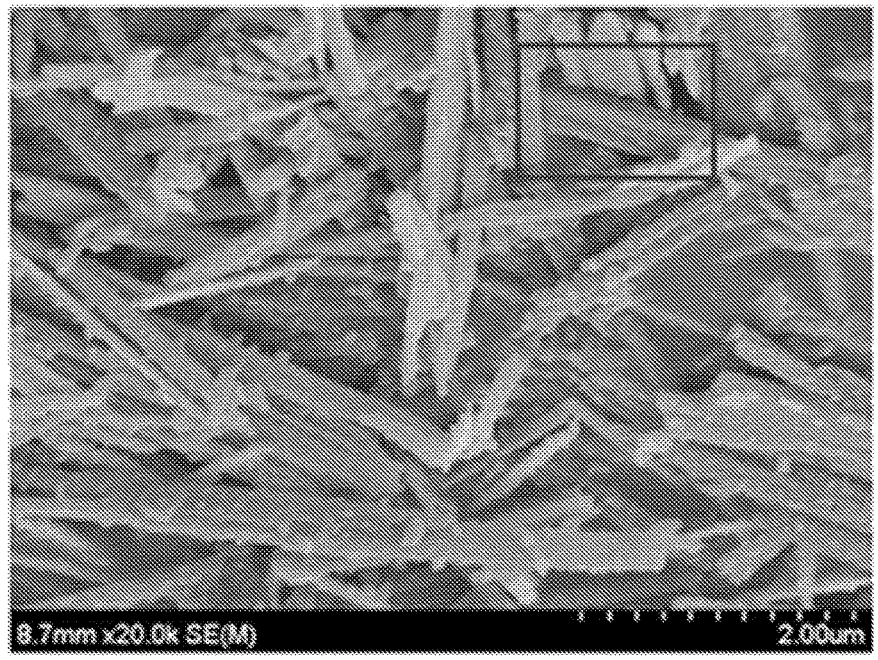
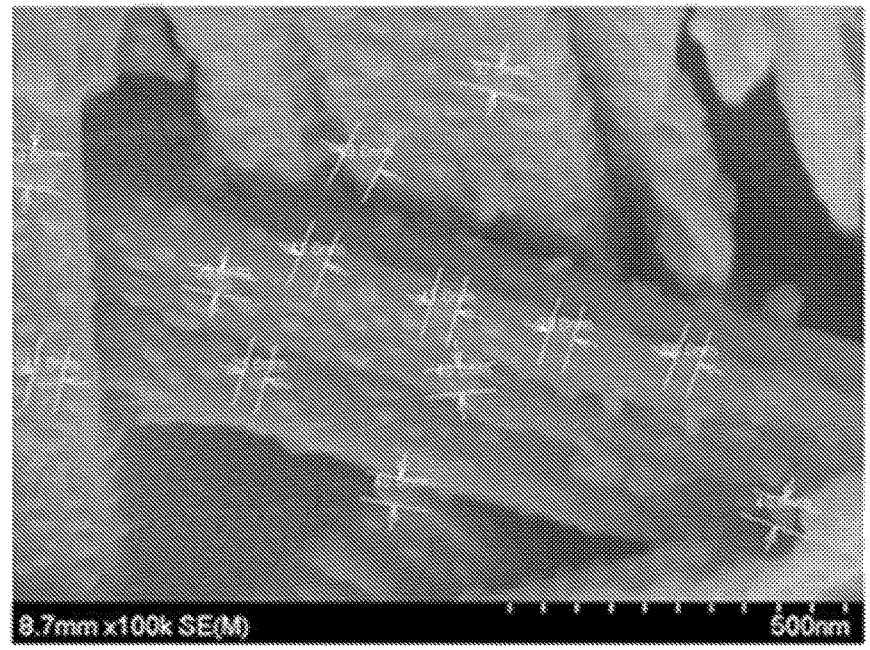

[Figure 9]
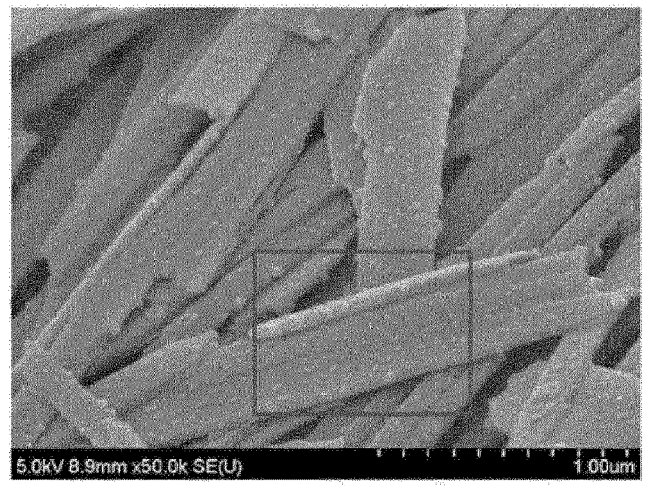
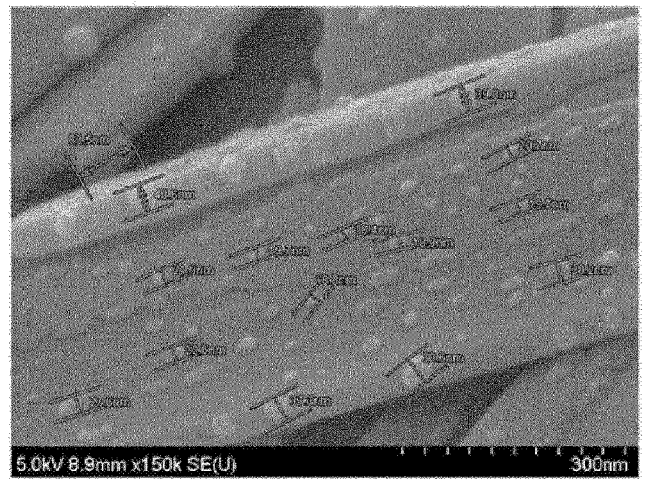

[Figure 10]
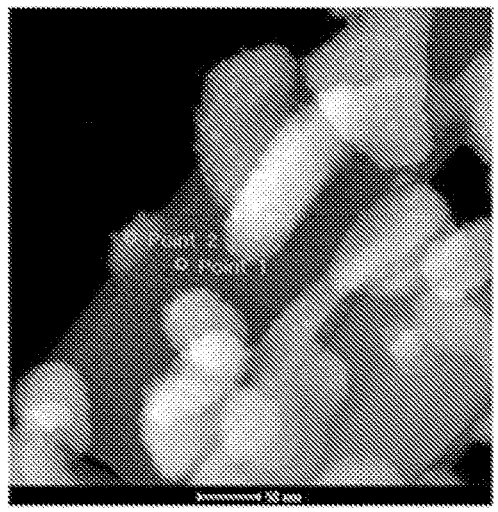
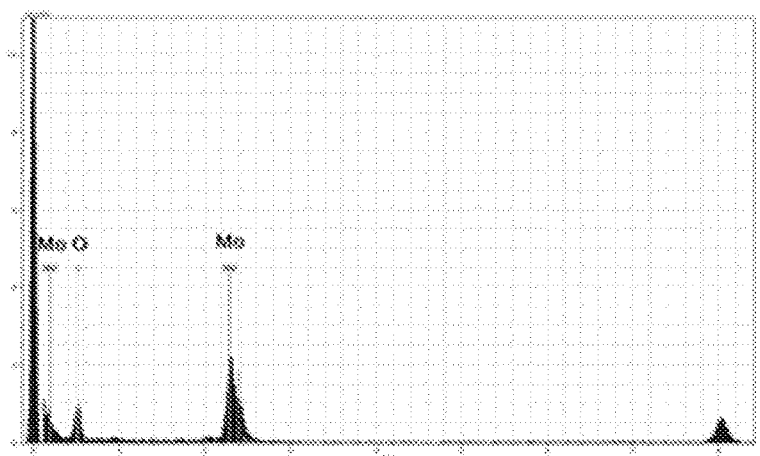
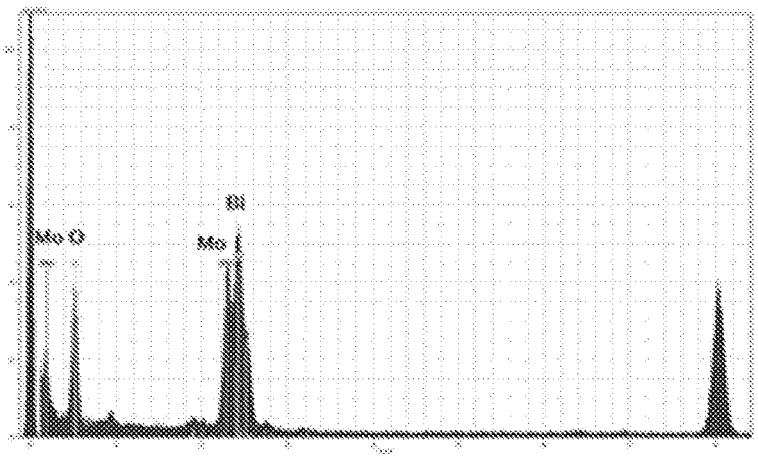

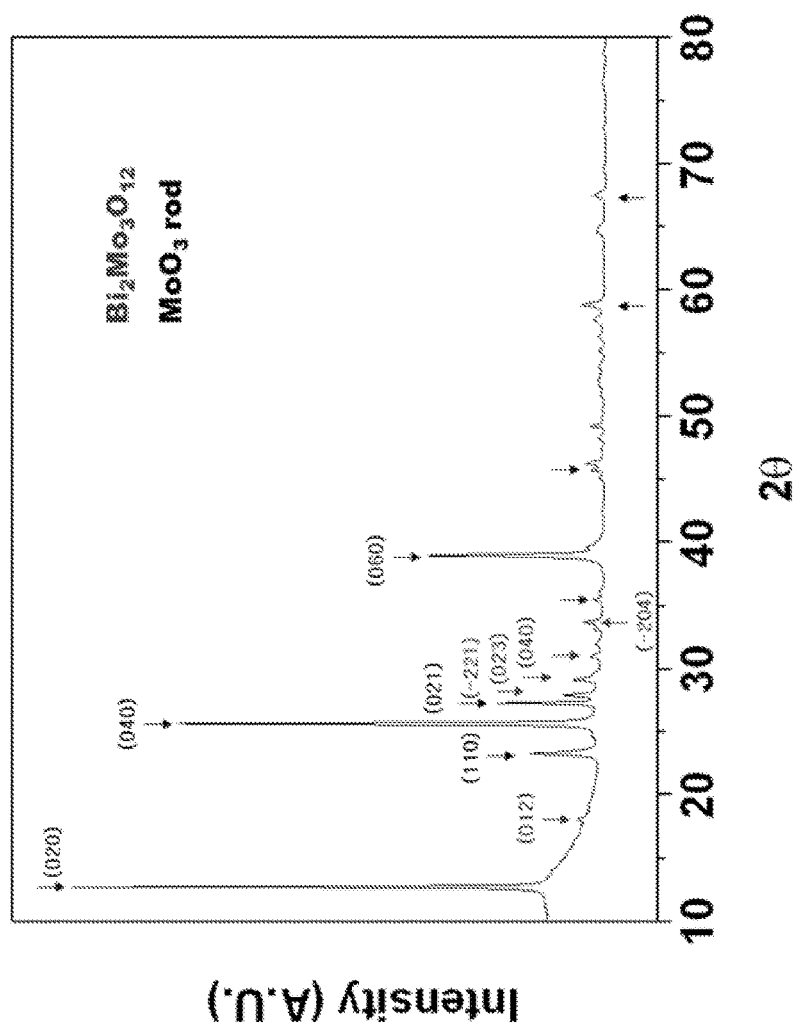
[Figure 11]

[Figure 12]
(a)
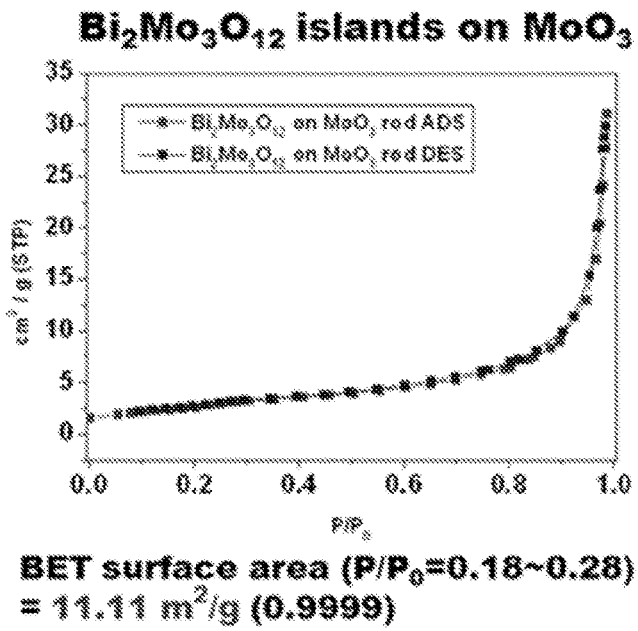
(b)
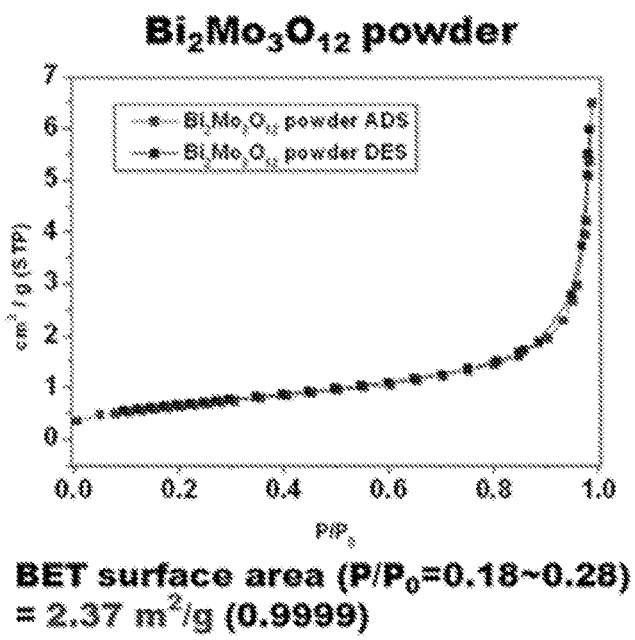

[Figure 13]
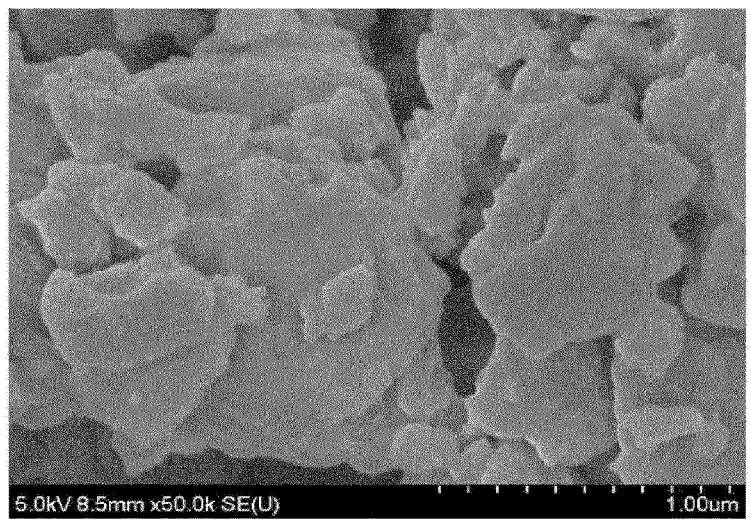

[Figure 14]

ICP ANALYSIS RESULT

| INSTRUMENT | ICP | |
|---|---|---|
| | CONTENT (wt %) | |
| | Bi | Mo |
| RESULT | 9.29 | 60.5 |
| $Bi_2Mo_3O_{12}$ islands on $MoO_3$ | | |

| | ICP | |
|---|---|---|
| | Normalized Bi | Normalized Mo |
| $Bi_2Mo_3O_{12}$ islands on $MoO_3$ | 13.31 | 86.69 |

Theoretical calculation of ratio of $MoO_3$ and $Bi_2Mo_3O_{12}$ particles, which are constituents of $Bi_2MO_3O_{12}$ island composite on rod-shaped $MoO_3$ Normalized Bi (13.46) = Particles (1) of $Bi_2Mo_3O_{12}$ * $Bi_2$ mol weight (208.98 * 2 g) of $Bi_2Mo_3O_{12}$ / [Particles (1) of $Bi_2Mo_3O_{12}$ * ($Bi_2$ and $Mo_3$ mol weight (208.98 * 2 g + 95.96 * 3 g) of $Bi_2Mo_3O_{12}$ + Particles (25) of $MoO_3$ * Mo mol weight (95.96 g) of $MoO_3$]

Normalized Mo (86.54) = [Particles (1) of $Bi_2Mo_3O_{12}$ * $Mo_3$ mol weight (95.96 * 3 g) of $Bi_2Mo_3O_{12}$ + Particles (25) of $MoO_3$ * Mo mol weight(95.96 g) of $MoO_3$] / [Particles (1) of $Bi_2Mo_3O_{12}$ * ($Bi_2$ and $Mo_3$ mol weight (208.98 * 2 g + 95.96 * 3 g) of $Bi_2Mo_3O_{12}$ + Particles (25) of $MoO_3$ * Mo mol weight (95.96 g) of $MoO_3$]

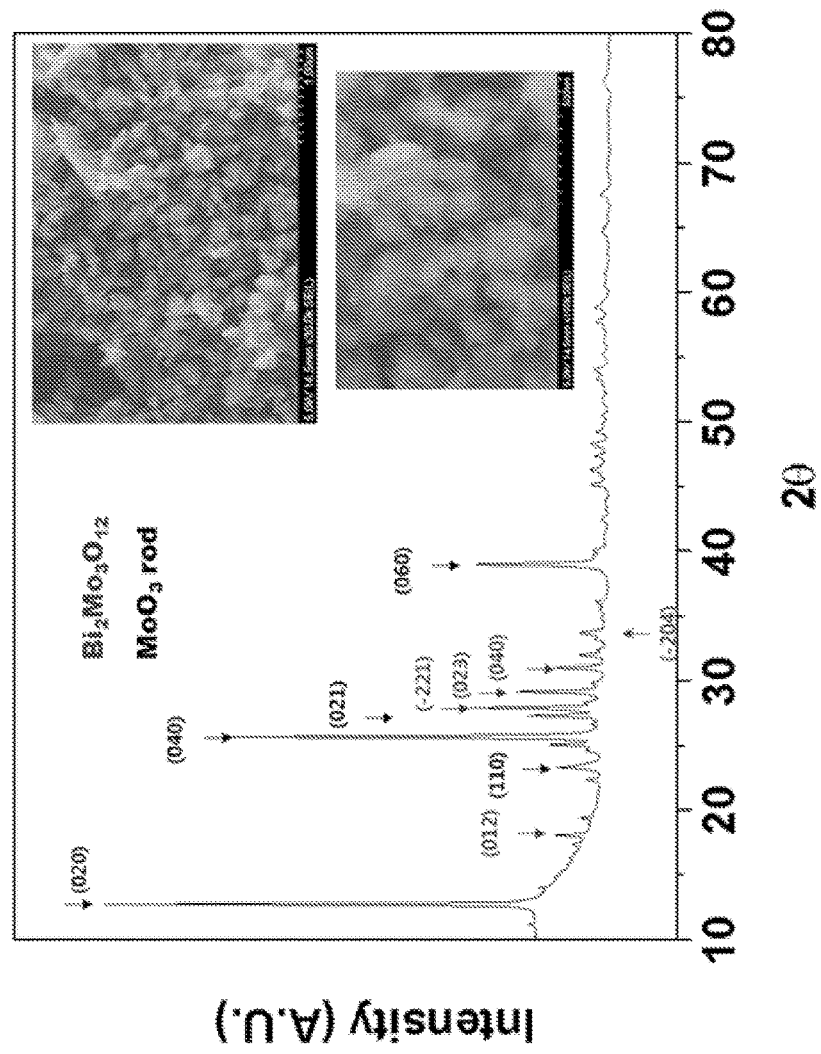
[Figure 15]

PREPARATION METHOD FOR ROD-SHAPED MOLYBDENUM OXIDE AND PREPARATION METHOD FOR MOLYBDENUM OXIDE COMPOSITE

TECHNICAL FIELD

This application is a National Stage Application of International Application No. PCT/KR2015/009072 filed on Aug. 28, 2015, which claims priority to and the benefit of KR 10-2014-0132698, filed Oct. 1, 2014, and KR-10-2014-0114481, filed Aug. 29, 2014, all of which are hereby incorporated by reference in their entirety for all purposes as if fully set forth herein.

The present specification relates to a preparation method for rod-shaped molybdenum oxide and a preparation method for a molybdenum oxide composite.

BACKGROUND ART

Metal molybdenum is a hard silver-white transition metal, has characteristics in that the specific gravity is 10.22, the melting point and the boiling point are 2,610° C. and 5,560° C., respectively, which are very high, the thermal conductivity is good, and the thermal expansion coefficient is low, and thus metal molybdenum is usually used as an alloying element for increasing hardness, strength, tensile strength, abrasion resistance, and the like for a high temperature and lightweight structural material for aircrafts, missiles, and the like, a high temperature electrical material, such as a filament support and an electrode of an electric furnace, and a special steel such as stainless steel, heat resisting steel, and super-alloy steel.

Approximately 70 to 80% of the amount of the molybdenum metal globally used is prepared in the form of a briquette of molybdenum oxide ($MoO_3$) or a molybdenum alloy, and the molybdenum metal is used as an alloying element of iron steel, and in addition, a considerable amount thereof is also used in the form of a molybdenum compound such as ammonium molybdate, sodium molybdate, or molybdenum oxide powder in various petroleum chemical products such as catalysts, lubricants, and pigments.

As the existing method for producing rod-shaped molybdenum oxide among the molybdenum oxides, a one-step hydrothermal synthesis method carried out in a hydrogen peroxide solution has been frequently used. Since a preparation method for rod-shaped molybdenum oxide through the one-step hydrothermal synthesis method is carried out under a high temperature condition of 100° C. or more, synthesis has been carried out under a high pressure condition according to the dissociation ($H_2O_2 \rightarrow H_2O + 1/2 O_2$) of hydrogen peroxide. The existing preparation method has difficulties in the mass production of samples due to high temperature and high pressure conditions. Accordingly, there is a need for developing a method capable of preparing rod-shaped molybdenum oxide under low temperature and pressure conditions.

Further, the molybdenum oxide may form a composite with metal molybdate, and the composite may be used as a catalyst, and as a result, studies have been conducted on preparation methods for the composite, and there is a need for developing a technology for carrying out the methods under much better conditions.

DETAILED DESCRIPTION OF THE INVENTION

Technical Problem

An exemplary embodiment of the present specification relates to a preparation method for rod-shaped molybdenum oxide and a preparation method for a molybdenum oxide composite.

Technical Solution

An exemplary embodiment of the present specification provides a preparation method for rod-shaped molybdenum oxide, the preparation method including:

(A) mixing a hydrogen peroxide solution and molybdenum oxide powder and warming the mixture from 20° C. to 30° C. to 95° C. or less to form $MoO_2(OH)(OOH)$; and (B) forming rod-shaped molybdenum oxide from the $MoO_2(OH)(OOH)$ through a hydrothermal synthesis method.

Further, an exemplary embodiment of the present specification provides rod-shaped molybdenum oxide prepared through the above-described preparation method.

In addition, an exemplary embodiment of the present specification includes a catalyst or a catalyst support, which includes the above-described rod-shaped molybdenum oxide.

Furthermore, an exemplary embodiment of the present specification provides a preparation device for rod-shaped molybdenum oxide, the preparation device including:

a first reactor in which a hydrogen peroxide solution and molybdenum oxide powder are reacted; and a second reactor in which rod-shaped molybdenum oxide is formed from $MoO_2(OH)(OOH)$ powder formed in the first reactor.

Further, an exemplary embodiment of the present specification provides a preparation method for a molybdenum oxide composite, the preparation method including:

(A) mixing a hydrogen peroxide solution and molybdenum oxide powder and warming the mixture from 20° C. to 30° C. to 95° C. or less to form $MoO_2(OH)(OOH)$;

(B) forming rod-shaped molybdenum oxide from the $MoO_2(OH)(OOH)$ through a hydrothermal synthesis method; and (C) mixing the rod-shaped molybdenum oxide and a bismuth precursor to form a composite in which bismuth molybdate islands are provided on the rod-shaped molybdenum oxide.

In addition, an exemplary embodiment of the present specification provides a molybdenum oxide composite prepared through the above-described preparation method for a molybdenum oxide composite.

Furthermore, an exemplary embodiment of the present specification provides a catalyst including the above-described composite.

Advantageous Effects

According to an exemplary embodiment of the present specification, when rod-shaped molybdenum oxide is prepared through a two-step process, there is an advantage in that rod-shaped molybdenum oxide may be prepared in a large amount under lower pressure and/or lower temperature conditions than the existing preparation method for molybdenum oxide.

Further, the preparation method for a molybdenum oxide composite according to an exemplary embodiment of the present specification has an advantage in that the molybdenum oxide composite may be synthesized at a temperature which is equal to or less than the boiling point of ethanol, and the amount of an ethanol solvent used is reduced.

BRIEF DESCRIPTION OF DRAWINGS

FIG. 1 is an SEM analysis result of molybdenum oxide, FIG. 1(a) illustrates the shape of a plate-like molybdenum oxide powder, FIG. 1(b) illustrates the shape of $MoO_2(OH)$ (OOH) which is a reaction product in Step (A), and FIG. 1(c) illustrates the shape of rod-shaped molybdenum oxide which is a reaction product in Step (B).

FIG. 2 is an XRD analysis result of $MoO_2(OH)(OOH)$.

FIG. 3 is an XRD analysis result of rod-shaped molybdenum oxide.

FIG. 4 illustrates SEM and XRD analysis results of $MoO_3 \cdot xH_2O$ which is an intermediate product produced when Step (B) in which rod-shaped molybdenum oxide is prepared from $MoO_2(OH)(OOH)$ is carried out at 100° C., and x denotes a value of 0 to 1.

FIG. 5 illustrates SEM and XRD analysis results of rod-shaped molybdenum oxide produced when Step (B) in which rod-shaped molybdenum oxide is prepared from $MoO_2(OH)(OOH)$ is carried out at 130° C.

FIG. 6(a) illustrates a BET analysis result showing the specific surface area of a commercially available $MoO_3$ powder, and FIGS. 6(b) and 6(c) illustrate BET analysis results showing the specific surface areas of rod-shaped molybdenum oxide according to the present invention.

FIG. 7(a) illustrates an SEM analysis result when rod-shaped molybdenum oxide is used as a catalyst support, and FIG. 7(b) illustrates an XRD analysis result when rod-shaped molybdenum oxide is used as a catalyst support.

FIG. 8 is a view illustrating SEM analysis results of a composite including rod-shaped molybdenum oxide and bismuth molybdate $(Bi_2Mo_3O_{12})$ islands provided on the rod-shaped molybdenum oxide.

FIG. 9 is a view illustrating an SEM analysis result of measuring the size of bismuth molybdate $(Bi_2Mo_3O_{12})$ islands provided on rod-shaped molybdenum oxide.

FIG. 10 is a TEM analysis result of a composite including rod-shaped molybdenum oxide and bismuth molybdate $(Bi_2Mo_3O_{12})$ islands provided on the rod-shaped molybdenum oxide, and is a view in which Point 1 illustrates rod-shaped molybdenum oxide and Point 2 illustrates bismuth molybdate $(Bi_2Mo_3O_{12})$ islands.

FIG. 11 is a view illustrating an XRD analysis result of a composite including rod-shaped molybdenum oxide and bismuth molybdate $(Bi_2Mo_3O_{12})$ islands provided on the rod-shaped molybdenum oxide.

FIG. 12(a) is a view illustrating a BET analysis result of a composite including rod-shaped molybdenum oxide and bismuth molybdate $(Bi_2Mo_3O_{12})$ islands provided on the rod-shaped molybdenum oxide, and FIG. 12(b) is a view illustrating a BET analysis result of bismuth molybdate $(Bi_2Mo_3O_{12})$ powder.

FIG. 13 is a view illustrating an SEM analysis result of bismuth molybdate $(Bi_2Mo_3O_{12})$ powder.

FIG. 14 is a view illustrating an ICP analysis result of a composite including rod-shaped molybdenum oxide and bismuth molybdate $(Bi_2Mo_3O_{12})$ islands provided on the rod-shaped molybdenum oxide, and equations of calculating the ratio of molybdenum oxide and bismuth molybdate $(Bi_2Mo_3O_{12})$ particles.

FIG. 15 is a view illustrating SEM and XRD analysis results of a composite including rod-shaped molybdenum oxide prepared by using nitric acid in excess water solvent, and bismuth molybdate $(Bi_2Mo_3O_{12})$ islands provided on the rod-shaped molybdenum oxide.

BEST MODE

The benefits and features of the present application, and the methods of achieving the benefits and features will become apparent with reference to exemplary embodiments to be described below in detail along with the accompanying drawings. However, the present application is not limited to the exemplary embodiments to be disclosed below, but may be implemented in various other forms, and the present exemplary embodiments are provided for rendering the disclosure of the present application complete and for fully representing the scope of the invention to a person with ordinary skill in the art to which the present application pertains, and the present application will be defined only by the scope of the claims.

Unless otherwise defined, all the terms including technical and scientific terms used in the present specification will be able to be used as a meaning which may be commonly understood to a person with ordinary skill in the art to which the present application pertains. Further, the terms defined in a dictionary generally used are not interpreted ideally or excessively unless the terms are clearly and specially defined.

Hereinafter, the present application will be described in detail.

An exemplary embodiment of the present specification provides a preparation method for rod-shaped molybdenum oxide, the preparation method including:

(A) mixing a hydrogen peroxide solution and molybdenum oxide powder and warming the mixture from 20° C. to 30° C. to 95° C. or less to form $MoO_2(OH)(OOH)$; and (B) forming rod-shaped molybdenum oxide from the $MoO_2(OH)(OOH)$ through a hydrothermal synthesis method.

According to an exemplary embodiment of the present specification, the hydrogen peroxide solution is a solution having a concentration of 10 to 50 wt % of hydrogen peroxide. The hydrogen peroxide solution may include a solvent, and as the solvent, a material generally used may be used, and an example thereof includes water.

In the present specification, the molybdenum oxide is an oxidized form of molybdenum (Mo), includes various forms, and includes $MoO_3$.

According to an exemplary embodiment of the present specification, the molybdenum oxide powder used in Step (A) includes various forms, and a commercially available molybdenum oxide powder may be used. Further, according to an exemplary embodiment of the present specification, the molybdenum oxide powder used in the reaction in Step (A) may be in a plate-like form.

According to an exemplary embodiment of the present specification, as the molybdenum oxide powder used in the reaction in Step (A), it is possible to use a molybdenum oxide powder having a length and a thickness at a several μm level.

According to an exemplary embodiment of the present specification, the ratio of the hydrogen peroxide solution and the molybdenum oxide powder added in Step (A) may be in a range of 0.23 ml to 1.53 ml of a 30% hydrogen peroxide solution per 1 g of the molybdenum oxide powder. According to an exemplary embodiment of the present specification, in the ratio of the hydrogen peroxide solution and the molybdenum oxide powder added in Step (A), when the 30% hydrogen peroxide solution per 1 g of the molybdenum oxide powder is present in an amount of 0.23 ml or more, there is an effect in that the reaction rate in Step (A) is increased, and when the 30% hydrogen peroxide solution is present in an amount of 1.53 ml or less, there is an effect in that it is possible to expect an increase in the reaction rate according to the distribution of an excessive amount of hydrogen peroxide.

According to an exemplary embodiment of the present specification, in Step (A), the mixing of the hydrogen peroxide solution and the molybdenum oxide powder may include both putting molybdenum oxide powder into a hydrogen peroxide solution and putting a hydrogen peroxide solution into molybdenum oxide powder.

According to an exemplary embodiment of the present specification, Step (A) may include the warming of the mixture during or after the mixing of the hydrogen peroxide solution and the molybdenum oxide powder.

Specifically, according to an exemplary embodiment of the present specification, Step (A) may include a stirring step, and may include the warming of the mixture during or after the stirring step.

Further, according to an exemplary embodiment of the present specification, in Step (A), the warming of the mixture may include maintaining the temperature while or after warming the mixture.

According to an exemplary embodiment of the present specification, in Step (A), the stirring step may be carried out in a temperature range of a normal temperature in a range of 20° C. to 30° C., or more and 95° C. or less, and the warming of the mixture may be carried out under a condition of 95° C. or less.

According to an exemplary embodiment of the present specification, the warming of the mixture in Step (A) is carried out such that the temperature is increased from normal temperature, and proceeds until the temperature is increased to a range of 80° C. to 95° C. When the reaction temperature becomes 80° C. or more through the warming of the mixture, the dissolved molybdenum oxide powder may be rapidly converted into dark yellow $MoO_2(OH)(OOH)$. Further, when the reaction temperature in the warming of the mixture is 95° C. or less, there is an effect of suppressing water included in the hydrogen peroxide solution from being evaporated.

According to an exemplary embodiment of the present specification, in Step (A), the rate of warming the mixture may be in a range of 1° C./min to 6° C./min, preferably in a range of 3° C./min to 5° C./min, and more preferably in a range of 4° C./min to 5° C./min.

That is, according to an exemplary embodiment of the present specification, in Step (A), the warming of the mixture may be carried out at a rate of 4° C./min to 5° C./min from the normal temperature of 20° C. to 30° C. to 95° C. or less.

According to an exemplary embodiment of the present specification, when the rate of warming the mixture is 4° C./min or more, there is an effect in that the rate of converting the molybdenum oxide powder into $MoO_2(OH)(OOH)$ is increased, and when the rate of warming the mixture is 5° C./min or less, there is an effect in that it is possible to prevent the amount of the oxygen gas dissociated from an excessive amount of hydrogen peroxide from being increased in a range of 60° C. to 65° C.

According to an exemplary embodiment of the present specification, in Step (A), the warming of the mixture is carried out in a range of 1 hour to 5 hours in total, and preferably within 3 hours. That is, the time for warming the mixture proceeds in accordance with the rate of warming the mixture until a range of 60° C. to 65° C. (taking 6 minutes to 12 minutes), and proceeds in accordance with the rate of warming the mixture until 95° C. (taking 6 minutes to 9 minutes) after the oxygen dissociated from an excessive amount of hydrogen peroxide is confirmed until a range of 60° C. to 65° C. and it is confirmed that the amount of oxygen is decreased (taking 30 minutes to 40 minutes). The solution turns dark yellow at 80° C. or more, and is warmed to 95° C., and then maintained at 95° C. for 2 hours to 2 hours and 30 minutes.

According to an exemplary embodiment of the present specification, the stirring step in Step (A) is carried out in a range of 1 hour to 5 hours, and preferably for approximately 3 hours in the same manner as in the warming of the mixture.

According to an exemplary embodiment of the present specification, Step (A) in the preparation method for rod-shaped molybdenum oxide may be carried out under a normal pressure condition. Since the first step is carried out under a normal pressure condition instead of a pressurized condition, the reaction product in Step (A) may be mass-produced. As the existing preparation method for rod-shaped molybdenum oxide, a hydrothermal synthesis method, which proceeds in one step, is frequently used, and the preparation method is performed at a high temperature, and not only is accompanied by dissociation of hydrogen peroxide, but also has difficulties in mass producing rod-shaped molybdenum oxide because the preparation method is carried out under a pressurized condition.

According to an exemplary embodiment of the present specification, Step (A) includes separating a reaction product $MoO_2(OH)(OOH)$.

According to another exemplary embodiment of the present specification, in Step (A), the separating of the reaction product $MoO_2(OH)(OOH)$ may be carried out through a centrifuge.

According to an exemplary embodiment of the present specification, Step (A) includes drying $MoO_2(OH)(OOH)$ while or after separating $MoO_2(OH)(OOH)$.

According to another exemplary embodiment of the present specification, in Step (A), the drying of $MoO_2(OH)(OOH)$ may include drying $MoO_2(OH)(OOH)$ in a vacuum oven, and $MoO_2(OH)(OOH)$ powder may be obtained through the step.

According to an exemplary embodiment of the present specification, in Step (B), a hydrothermal synthesis method may be used. In the present specification, the hydrothermal synthesis method is one of the liquid-phase synthesis methods and refers to a method for synthesizing a material by using water.

According to an exemplary embodiment of the present specification, in the preparation method for rod-shaped molybdenum oxide, Step (B) includes warming the mixture from normal temperature to a temperature of 130° C. to 160° C. That is, Step (B) may include warming the mixture from the normal temperature of 20° C. to 30° C. to a range of 130° C. to 160° C.

Further, according to an exemplary embodiment of the present specification, Step (B) includes maintaining the temperature during or after the warming of the mixture.

According to an exemplary embodiment of the present specification, in Step (B), when the temperature is 130° C. or more, there is an effect in that the thickness of rod-shaped molybdenum oxide is narrowed because pressure is increased, and when the temperature is 160° C. or less, there is an effect in that pressure in a hydrothermal synthesis container is decreased.

According to an exemplary embodiment of the present specification, when Step (B) is warmed and/or maintained from a normal temperature to a temperature of less than 130° C., a phase of hydrated molybdenum oxide ($MoO_3 \cdot xH_2O$ [$0<x<1$]) phase is also detected, and the phase may be explained as a phase present in an intermediate step while the $MoO_2(OH)(OOH)$ phase is not changed to a final $MoO_3$ phase.

FIG. 4 illustrates SEM and XRD analysis results of an intermediate product $MoO_3 \cdot xH_2O$ ($0<x<1$) produced when Step (B) of preparing rod-shaped molybdenum oxide from $MoO_2(OH)(OOH)$ is carried out at 100° C., and FIG. 5 illustrates SEM and XRD analysis results of rod-shaped molybdenum oxide produced when Step (B) of preparing rod-shaped molybdenum oxide from $MoO_2(OH)(OOH)$ is carried out at 130° C.

According to an exemplary embodiment of the present specification, in Step (B), the maintaining of the temperature may be carried out for 10 hours to 30 hours, preferably 15 hours to 25 hours, and more preferably 20 hours.

According to an exemplary embodiment of the present specification, it is possible to obtain the reaction product in Step (A) under a normal pressure condition instead of a pressurized condition in Step (A), and subsequently, Step (B) may be carried out. Accordingly, Step (B) may be carried out under a low pressure condition, and there is an effect in that it is possible to mass produce rod-shaped molybdenum oxide which is a final product resulting from Step (B).

Further, according to an exemplary embodiment of the present specification, in Step (B), water may be used instead of hydrogen peroxide. Accordingly, since the pressure of water ($H_2O$) and the pressure of a partial oxygen gas generated from the reaction [$MoO_2(OH)(OOH) + H_2O \rightarrow MoO_3 + 2H_2O + \frac{1}{2}O_2$] of converting $MoO_2(OH)(OOH)$ into $MoO_3$ are only considered as the pressure in Step (B), it is possible to mass produce rod-shaped molybdenum oxide under a low pressure condition.

In contrast, since hydrogen peroxide is used in the preparation method for rod-shaped molybdenum oxide through the existing one-step hydrothermal synthesis method, the preparation method is essentially accompanied by the dissociation reaction ($H_2O_2 \rightarrow H_2O + \frac{1}{2}O_2$) of hydrogen peroxide, and accordingly, there is a disadvantage in that the reaction proceeds under a high pressure condition.

According to an exemplary embodiment of the present specification, Step (B) in the preparation method for rod-shaped molybdenum oxide may be carried out under a pressure condition in a range of 10 atm to 20 atm, and preferably a range of 13 atm to 14 atm, that is, under a pressure condition of 13 atm to 14 atm. In this case, the pressure means a value obtained by measuring an internal pressure of a hydrothermal synthesis container, and specifically, the 13 atm is a value of measuring an internal pressure in the hydrothermal synthesis container under a temperature condition of 130° C., and the 14 atm is a value obtained by measuring an internal pressure of the hydrothermal synthesis container under a temperature condition of 160° C.

According to an exemplary embodiment of the present specification, when the pressure in Step (B) is 13 atm or more, the thickness of the rod-shaped molybdenum oxide is widely distributed in a range of 80 nm to 350 nm, and there is an effect in that as the temperature is increased, the pressure in the gas is increased, so that the thickness of the rod-shaped molybdenum oxide is narrowed to a range of 100 nm to 300 nm.

For example, in the Experimental Examples of the present invention, in Step (B), 7.12 g of $MoO_2(OH)(OOH)$ and 25 ml of water were put into a 100 ml hydrothermal synthesis container and reacted with each other under a condition of 160° C., and due to the process, a water pressure of 6.06 atm and an oxygen pressure of 7.53 atm (calculated by the ideal gas state equation PV=nRT) were generated, and as a result, a total pressure of approximately 13.59 atm was generated in the hydrothermal synthesis container.

In contrast, in the case of the existing preparation method for molybdenum oxide through the one step, when 4.32 g of a plate-like molybdenum oxide powder and 34 ml of a 30% hydrogen peroxide solution were put into a 100 ml hydrothermal synthesis container and reacted with each other under a condition of 160° C., a water pressure of 6.06 atm and an oxygen gas pressure of 53.26 atm ($H_2O_2 \rightarrow H_2O + \frac{1}{2}O_2$, calculated by the ideal gas state equation PV=nRT) were generated, and as a result, a total pressure of approximately 59.32 atm was generated in the hydrothermal synthesis container.

That is, as the amount of $MoO_2(OH)(OOH)$ introduced into the reaction in Step (B) is increased, the internal pressure is increased, but when compared to the pressure condition of the existing preparation method for molybdenum oxide through the one step, it was confirmed that the amount of $MoO_2(OH)(OOH)$, which is about 4.4 times larger, could be further introduced (7.12 g×4.4 times=31.33 g). Accordingly, the present invention has an advantage in that rod-shaped molybdenum oxide may be produced in a larger amount than the preparation method for rod-shaped molybdenum oxide in the related art.

According to an exemplary embodiment of the present specification, for the reaction amount in Step (B), the amount of $MoO_2(OH)(OOH)$ introduced may be adjusted in a range in which the container may withstand pressure. For example, in Step (B), a 200 ml container of Model 4748A manufactured by Parr Instrument Co.(Parr instrument company, Model 4748A, 200 ml) was used, and the step was carried out under a condition of approximately 1,900 psig (=129.3 atm) at 250° C.

According to an exemplary embodiment of the present specification, Step (B) includes mixing $MoO_2(OH)(OOH)$ and water.

According to an exemplary embodiment of the present specification, the $MoO_2(OH)(OOH)$ used in Step (B) includes various forms, and may be preferably a form of powder.

According to an exemplary embodiment of the present specification, the mixing of the $MoO_2(OH)(OOH)$ and the water includes putting $MoO_2(OH)(OOH)$ into water, or putting water into $MoO_2(OH)(OOH)$.

According to an exemplary embodiment of the present specification, Step (B) may include a stirring step, and may include the above-described warming of the mixture from normal temperature to a temperature of 130° C. to 160° C. during or after the stirring step.

Further, according to an exemplary embodiment of the present specification, the stirring step in Step (B) may be carried out at a normal temperature.

According to an exemplary embodiment of the present specification, in Step (B), the warming of the mixture may include putting the mixture into an oven at normal pressure and maintaining the container.

According to an exemplary embodiment of the present specification, in Step (B), the warming of the mixture may include putting the mixture into a container in which the internal temperature is in a range of 130° C. to 160° C., and maintaining the container for 20 hours to 48 hours.

According to an exemplary embodiment of the present specification, in the preparation method for rod-shaped molybdenum oxide, Step (A) is performed at a first temperature, and Step (B) is carried out at a second temperature higher than the first temperature.

According to an exemplary embodiment of the present specification, the preparation method includes separating rod-shaped molybdenum oxide after Step (B).

According to an exemplary embodiment of the present specification, in the separating of the rod-shaped molybdenum oxide after Step (B), the temperature is lowered to normal temperature, and then the rod-shaped molybdenum oxide may be separated through a centrifuge.

According to an exemplary embodiment of the present specification, in the preparation method for rod-shaped molybdenum oxide, the yield of the reaction in Step (A) is in a range of 50 to 53.4 g of $MoO_2(OH)(OOH)$ powder per 43.2 g of molybdenum oxide powder.

According to an exemplary embodiment of the present specification, the rod-shaped molybdenum oxide powder prepared through the preparation method for rod-shaped molybdenum oxide is present in an amount of 5.6 to 6.1 g per 25 ml of $H_2O$.

According to an exemplary embodiment of the present specification, the rod-shaped molybdenum oxide powder prepared through the preparation method for rod-shaped molybdenum oxide is present in an amount of 5.6 to 6.1 g per 7.12 g of $MoO_2(OH)(OOH)$ powder.

Another exemplary embodiment of the present specification provides a preparation device for rod-shaped molybdenum oxide, the preparation device including:

a first reactor in which a hydrogen peroxide solution and molybdenum oxide powder are reacted to form $MoO_2(OH)(OOH)$; and a second reactor in which rod-shaped molybdenum oxide is formed from $MoO_2(OH)(OOH)$ formed in the first reactor.

According to an exemplary embodiment of the present specification, in the preparation device for rod-shaped molybdenum oxide, the first reactor includes:

a hopper part that weighs molybdenum oxide released from a storage hopper in which the molybdenum oxide powder is kept in a predetermined amount in a weighing hopper, and releases the molybdenum oxide powder in a quantitative amount;

a stirrer in which the molybdenum oxide quantitatively weighed from the weighing hopper and the hydrogen peroxide solution are supplied in a predetermined amount, and a rotating body disposed in an internal space is rotated in one direction as a stirring motor to mix the molybdenum oxide powder and the hydrogen peroxide solution;

a warming device that warms a mixture of the molybdenum oxide powder and the hydrogen peroxide solution, which is formed by the mixing to a specific temperature to maintain the temperature;

a separator that separates $MoO_2(HO)(OOH)$ which is a product formed through a reaction in the warming device by using centrifugal force; and a dryer that dries the $MoO2(OH)(OOH)$ separated by the separator.

According to an exemplary embodiment of the present specification, in the preparation device for rod-shaped molybdenum oxide, the second reactor includes:

a hopper part that weighs $MoO_2(HO)(OOH)$ produced in the first reactor in a weighing hopper and quantitatively releases $MoO_2(HO)(OOH)$;

a stirrer in which the $MoO_2(HO)(OOH)$ quantitatively weighed from the weighing hopper and water are supplied in a predetermined amount, and a rotating body disposed in an internal space is rotated in one direction as a stirring motor to mix the $MoO_2(HO)(OOH)$ and the water;

a warming device that warms a mixture of the $MoO_2(HO)(OOH)$ and the water, which is formed by the mixing to a specific temperature to maintain the temperature;

a separator that separates rod-shaped molybdenum oxide which is a product formed through a reaction in the warming device; and a dryer that dries the rod-shaped molybdenum oxide separated by the separator.

Another exemplary embodiment of the present specification provides the rod-shaped molybdenum oxide prepared through Step (A); and Step (B).

The rod-shaped molybdenum oxide according to an exemplary embodiment of the present specification includes a form in which an axis is larger than the other axis. Hereinafter, the longest particle diameter of the rod shape will be referred to as a length, and the shortest particle diameter thereof will be referred to as a thickness.

According to an exemplary embodiment of the present specification, the rod-shaped molybdenum oxide has a length in a range of 500 nm to 4 μm, and more preferably in a range of 1.5 μm to 2.5 μm.

According to an exemplary embodiment of the present specification, it is possible to prepare rod-shaped molybdenum oxide having a smaller size than that of the related art. Specifically, when the rod-shaped molybdenum oxide is prepared by the preparation method according to an exemplary embodiment of the present specification, there is an advantage in that rod-shaped molybdenum oxide having a smaller size may be prepared for the same reaction time as compared to the case in which the rod-shaped molybdenum oxide is prepared by the hydrothermal synthesis method through the one-step in the related art.

The rod-shaped molybdenum oxide according to an exemplary embodiment of the present specification has a smaller size than in the related, and thus has a relatively higher specific surface area, so that there is an effect of exhibiting a higher activity than when the rod-shaped molybdenum oxide is utilized as a catalyst or a catalyst support.

According to an exemplary embodiment of the present specification, the length of the rod-shaped molybdenum oxide is a result of a reaction of $MoO_2(OH)(OOH)$ powder and water (total pressure: 13.59 atm), and in the Experimental Examples of the present invention, starting from a thickness in a range of 100 nm to 300 nm, most of the rod-shaped molybdenum oxides were grown to a rod-shape having a length of several μm.

In contrast, in the case of molybdenum oxide prepared from the existing hydrogen peroxide solution (J. Phys. Chem. C, (2007) 111, 2401), it was confirmed that when 1.44 g of a plate-like molybdenum oxide powder and 11 ml of 30% $H_2O_2$ were put into a 100 ml hydrothermal synthesis container under a condition of 170° C. and reacted for 20 hours, the rod-shaped molybdenum oxide was grown to a range of more than 4 μm and less than 7.5 μm in a range of 250 nm in thickness.

However, the existing preparation method for rod-shaped molybdenum oxide was carried out under a high-pressure hydrothermal synthesis condition (total 58.76 atm).

According to an exemplary embodiment of the present specification, the rod-shaped molybdenum oxide has a thickness in a range of 100 nm to 300 nm.

According to an exemplary embodiment of the present specification, the rod-shaped molybdenum oxide has a thickness of 250 nm or less, and a rod-shaped molybdenum oxide having a thickness of 250 nm is mostly abundantly distributed.

According to an exemplary embodiment of the present specification, when the rod-shaped molybdenum oxide has a length in a range of 500 nm to 4 μm and a thickness in a range of 100 nm to 300 nm, the rod-shaped molybdenum oxide may have a large specific surface area, and when the molybdenum oxide having a large specific surface area as described above is used as a catalyst or a catalyst support, it is possible to secure a larger contact area than the existing molybdenum oxide having a low specific surface area and exhibit an excellent effect.

According to an exemplary embodiment of the present specification, a ratio of length to thickness of the rod-shaped molybdenum oxide prepared through the two-step reaction is 5:1 to 13:1, and more preferably 6:1 to 10:1. When the ratio of length to thickness of the rod-shaped molybdenum oxide is 5:1 or more, there is an effect in that it is possible to produce more molybdenum oxides at the same weight as compared to the case where the ratio is less than 5:1, and the specific surface area is increased.

Another exemplary embodiment of the present specification provides a catalyst including the rod-shaped molybdenum oxide.

Still another exemplary embodiment of the present specification provides a catalyst support (substrate) including the rod-shaped molybdenum oxide.

According to an exemplary embodiment of the present specification, the catalyst is a material which is involved in a chemical reaction to change the reaction rate, but the catalyst itself remains constant before and after the reaction. That is, in order that the chemical reaction may be carried out, the reaction material needs to go through an activation state, and since the activation state is a state in which the energy is higher than the reaction material or the production material, the reaction material needs to have sufficient energy in order that the reaction may occur. The catalyst causes the reaction material to initiate a reaction through a route which is higher or lower than the activation energy.

According to an exemplary embodiment of the present specification, the rod-shaped molybdenum oxide serves to stably put, as a catalyst support, a material having a catalyst function, such as metal or oxide and maintain the material.

According to an exemplary embodiment of the present specification, the rod-shaped molybdenum oxide may increase the reaction area as a catalyst to improve the reactivity or may be used as a catalyst support for improving adhesion to the catalyst.

According to an exemplary embodiment of the present specification, the rod-shaped molybdenum oxide may disperse, as a catalyst support, a material having a catalyst function to stably put and maintain the material.

According to an exemplary embodiment of the present specification, the rod-shaped molybdenum oxide is used as a catalyst or a catalyst support to highly disperse the material having a catalyst function so as to increase the exposed surface area of the material, and to support the material, and is mechanically, thermally, and chemically stable.

According to an exemplary embodiment of the present specification, the rod-shaped molybdenum oxide may be used as a material which supports a material including a metal such as Bi or Fe as a material having a catalyst function.

According to an exemplary embodiment of the present specification, the rod-shaped molybdenum oxide may be used as a catalyst for various partial oxidation reactions, and as an example, may be used as a catalyst for a partial oxidation reaction which produces 1,3-butadiene from 1-butene.

According to an exemplary embodiment of the present specification, it is possible to prepare a rod-shaped molybdenum oxide having a smaller size than in the related art, and accordingly, it is possible to prepare a rod-shaped molybdenum oxide having a large specific surface area.

According to an exemplary embodiment of the present specification, the rod-shaped molybdenum oxide has a specific surface area in a range of 9 $m^2/g$ to 12 $m^2/g$. The specific surface of the rod-shaped molybdenum oxide has a larger specific surface area than the specific surface area of the existing molybdenum oxide nanobelt using hydrogen peroxide (8.8 $m^2/g$, Sci. Rep-UK., 3 (2013), 2881). When the rod-shaped molybdenum oxide has a specific surface area of 9 $m^2/g$ or more, there is an effect in that the catalyst reaction area is widened and the area of a support capable of bearing a catalyst having a nano size is also widened.

According to an exemplary embodiment of the present specification, since the rod-shaped molybdenum oxide prepared through the two-step preparation method has 9- to 12-fold larger specific surface area than the specific surface area (1.026 $m^2/g$) of the existing commercially available molybdenum oxide, it is possible to expect an effect in that the performance of the catalyst is improved due to the large reaction area when the rod-shaped molybdenum oxide serves as a catalyst.

Even through the Experimental Examples of the present specification, it was confirmed that the rod-shaped molybdenum oxide according to an exemplary embodiment of the present specification has a larger specific surface area than that of the existing commercially available molybdenum oxide, and FIG. 6 illustrates the experimental results.

That is, FIG. 6(a) illustrates a BET analysis result showing the specific surface area of a commercially available $MoO_3$ powder, and FIGS. 6(b) and 6(c) illustrate BET analysis results showing the specific surface areas of rod-shaped molybdenum oxide according to the present invention.

Further, even when the rod-shaped molybdenum oxide is used as a catalyst support according to an exemplary embodiment of the present specification, it is possible to expect an effect of increasing the reaction area of the catalyst because the area of a support capable of bearing a catalyst having a nano size is widened.

According to an exemplary embodiment of the present specification, by using the preparation method for rod-shaped molybdenum oxide, which includes the two steps, it is possible to prepare a rod-shaped molybdenum oxide having a large specific surface area and to prepare a catalyst using the rod-shaped molybdenum oxide having a large specific surface area.

Further, an exemplary embodiment of the present specification provides a preparation method for a molybdenum oxide composite, the method including:

(A) mixing a hydrogen peroxide solution and molybdenum oxide powder and warming the mixture from 20° C. to 30° C. to 95° C. or less to form $MoO_2(OH)(OOH)$;

(B) forming rod-shaped molybdenum oxide from the MoO$_2$(OH)(OOH) through a hydrothermal synthesis method; and (C) mixing the rod-shaped molybdenum oxide and a bismuth precursor to form a composite in which bismuth molybdate islands are provided on the rod-shaped molybdenum oxide.

In the preparation method for a molybdenum oxide composite, the aforementioned description may be equally applied to the contents on Step (A) and Step (B).

According to an exemplary embodiment of the present specification, Step (C) includes: mixing a) a solution including a bismuth precursor and b) a solution including rod-shaped molybdenum oxide.

Specifically, according to an exemplary embodiment of the present specification, Step (C) includes: mixing a solution including rod-shaped molybdenum oxide and a solution including a bismuth precursor, and then adding dropwise water thereto.

According to an exemplary embodiment of the present specification, a) the solution including a bismuth precursor may include a bismuth precursor and a solvent.

According to an exemplary embodiment of the present specification, the bismuth precursor includes various types of materials including bismuth, and is not particularly limited, but preferably includes bismuth nitrate (Bi(NO$_3$)$_3$·5H$_2$O).

According to an exemplary embodiment of the present specification, a material having an OH functional group such as alcohol may be used as a solvent used in a) the solution including a bismuth precursor, and a small amount of water may also be used together.

According to an exemplary embodiment of the present specification, the material having an OH functional group is a compound having one or more OH groups, and as the material having an OH group, preferably, alcohol may be used, and more preferably, ethanol may be used.

According to an exemplary embodiment of the present specification, a) the solution including a bismuth precursor may additionally include other additives such as a dispersant in order to dissolve the bismuth precursor, and a polyol having two or more OH functional groups may be used.

According to an exemplary embodiment of the present specification, the polyol is a compound having two or more OH functional groups, non-limiting examples of the polyol include ethylene glycol, propylene glycol, tetramethylene glycol, etherified diethylene glycol, dipropylene glycol, polyethylene glycol, glycerol, and the like, and preferably, glycerol may be used. That is, when the other additives are added, there is an effect in that the polyol having two or more OH functional groups, such as glycerol, contributes to dissolving the bismuth precursor.

According to an exemplary embodiment of the present specification, in a) the solution including a bismuth precursor, ethanol may be used as a solvent, and glycerol may be used as a dispersant for dispersing the bismuth precursor in the solvent.

According to an exemplary embodiment of the present specification, in a) the solution including a bismuth precursor, water may also be used as a solvent, but when an excessive amount of water is used as a solvent, there may occur a problem in that the surface of molybdenum oxide is affected so that the rate at which molybdenum oxide is dissociated into MoO$_4^{2-}$ and H$^+$ is increased (MoO$_3$+H$_2$O →MoO$_4^{2-}$+2H$^+$), and accordingly, the shape thereof is changed (Zolfrank et.al, Mater. Sci. Eng. C, 2012, 32, 47). Meanwhile, for the bismuth precursor, nitric acid was used as a dispersant in a solvent including water, but when nitric acid is used, hydrogen ion (H$^+$) is abundantly present in the solution, and hydrogen ions permeating into the molybdenum oxide are abundantly present, so that the shape may be modified (Shakir et al., Electrochim. Acta, 2010, 56, 376).

FIG. 15 illustrates the shape (SEM) and structure (XRD) of a composite including bismuth molybdate islands provided on the rod-shaped molybdenum oxide prepared by using nitric acid in an excessive amount of a water solvent, confirming that the shape is severely modified. Accordingly, in order to maintain the shape and structure of a composite of a metal and molybdenum oxide, it is preferred to use alcohol or a small amount of water as a solvent used in a preparation method for the composite.

According to an exemplary embodiment of the present specification, a) the solution including a bismuth precursor may be prepared by putting a solvent into a bismuth precursor or putting the bismuth precursor into the solvent.

According to an exemplary embodiment of the present specification, in a) the solution including a bismuth precursor, the content ratio of the bismuth precursor (Bi(NO$_3$)$_3$·5H$_2$O)(mg) to the solvent (ml) is preferably 6:1 to 10:1, more preferably 7:1 to 10:1, and even more preferably 7.03:1 to 9.38:1.

According to an exemplary embodiment of the present specification, in a) the solution including a bismuth precursor, when the content ratio of the bismuth precursor (Bi(NO$_3$)$_3$·5H$_2$O)(mg) to the solvent (ml) to is 7.03:1 or more, there is an effect in that it is possible to secure a sufficient number of bismuth molybdate islands grown to an appropriate size on the rod-shaped molybdenum oxide, and the islands may be distributed at a regular interval.

According to an exemplary embodiment of the present specification, in a) the solution including a bismuth precursor, when the content ratio of the bismuth precursor (Bi(NO$_3$)$_3$·5H$_2$O)(mg) to the solvent (ml) is 9.38:1 or less, there is an effect in that it is possible to prevent bismuth molybdate islands provided on rod-shaped molybdenum oxide from being distributed at an irregular interval and bismuth molybdate, which has not been grown on rod-shaped molybdenum oxide, from being formed.

According to an exemplary embodiment of the present specification, the preparation of a) the solution including a bismuth precursor includes mixing a bismuth precursor and a solvent, and may further include warming the mixture.

According to an exemplary embodiment of the present specification, in the preparation of a) the solution including a bismuth precursor, the mixing of the bismuth precursor and the solvent may include stirring the mixture, and may include warming the mixture during or after the stirring of the mixture.

According to an exemplary embodiment of the present specification, in the preparation of a) the solution including a bismuth precursor, the warming of the mixture includes warming the mixture from normal temperature to a temperature range of 40° C. to 60° C.

According to an exemplary embodiment of the present specification, in the preparation of the solution including a bismuth precursor, when the temperature in the warming of the mixture is 40° C. or more, there is an effect in that the bismuth precursor is dissolved in the ethanol solvent, and when the temperature in the warming of the mixture is 60° C. or less, there is an effect in which the volatility of the ethanol solvent is not increased, and the bismuth precursor is dissolved.

According to an exemplary embodiment of the present specification, when a) the solution including a bismuth precursor is prepared under a temperature condition of 40° C. to 60° C., there is an effect in that a white bismuth precursor, which has not been dissolved in ethanol, is dissolved in ethanol, and thus the solution becomes transparent.

According to an exemplary embodiment of the present specification, b) the solution including rod-shaped molybdenum oxide may include the above-described rod-shaped molybdenum oxide and a solvent.

According to an exemplary embodiment of the present specification, a material having an OH functional group such as alcohol may be used as a solvent used in b) the solution including rod-shaped molybdenum oxide, and a small amount of water may also be used together.

According to an exemplary embodiment of the present specification, the material having an OH functional group, as a solvent used in b) the solution including rod-shaped molybdenum oxide, is a compound having one or more OH groups, and as the material having an OH group, preferably, alcohol may be used, and more preferably, ethanol may be used.

According to an exemplary embodiment of the present specification, the preparation of b) the solution including rod-shaped molybdenum oxide may include mixing rod-shaped molybdenum oxide and a solvent, and the mixing of rod-shaped molybdenum oxide and the solvent includes putting the solvent into the rod-shaped molybdenum oxide, or putting the rod-shaped molybdenum oxide into the solvent.

According to an exemplary embodiment of the present specification, in b) the solution including rod-shaped molybdenum oxide, the content ratio of the rod-shaped molybdenum oxide (mg) to the solvent (ml) to is in a range of 10:1 to 30:1, and preferably in a range of 20:1 to 30:1.

For example, in the Experimental Example of the present invention, an experiment was performed at 23.98 mg of rod-shaped molybdenum oxide: 1 ml of ethanol to prepare a composite including rod-shaped molybdenum oxide and bismuth molybdate islands provided on the rod-shaped molybdenum oxide.

According to an exemplary embodiment of the present specification, the preparation of b) the solution including rod-shaped molybdenum oxide includes mixing rod-shaped molybdenum oxide and a solvent, and may additionally include warming a mixture solution of rod-shaped molybdenum oxide and a solvent.

According to an exemplary embodiment of the present specification, in the preparation of b) the solution including rod-shaped molybdenum oxide, the mixing of the rod-shaped molybdenum oxide and the solvent may include stirring the mixture, and may additionally include warming the mixture during or after the stirring of the mixture.

According to an exemplary embodiment of the present specification, in the preparation of b) the solution including rod-shaped molybdenum oxide, the warming of the mixture includes warming the mixture in a temperature range of normal temperature to 70° C. or less, and when the temperature is 70° C. or less, there is an effect in that the evaporation phenomenon of the solvent is suppressed because the temperature is equal to or less than the boiling point of ethanol and the reaction with the bismuth precursor solution is facilitated.

According to an exemplary embodiment of the present specification, Step (C) may be carried out at a temperature which is equal to or less than the boiling point (78.37° C.) of ethanol.

According to an exemplary embodiment of the present specification, in a preparation method for the composite, there is an effect in that a molybdenum oxide composite may be formed under a temperature condition which is equal to or less than the boiling point of ethanol, and the amount of ethanol solvent used may be reduced.

In contrast, the existing preparation method for a composition is carried out under a temperature condition of the boiling point or more of the ethanol solvent, and accordingly, there is a disadvantage in that a large amount of solvent needs to be used.

For example, in the Experimental Examples of the present invention, 11 ml of ethanol per 1 mmol (143.96 mg) of rod-shaped molybdenum oxide was used as a solvent by the preparation method of the present invention, but when the existing method is used, 33 ml of ethanol was used. Therefore, when the preparation method of the present invention is used, it can be confirmed that the amount of ethanol which is the solvent used may be reduced to ⅓ times.

According to an exemplary embodiment of the present specification, in the preparation method for the composite, in b) the solution including rod-shaped molybdenum oxide, 11 ml to 33 ml of ethanol compared to 1 mmol (143.96 mg) of rod-shaped molybdenum oxide is used as the solvent.

Specifically, according to an exemplary embodiment of the present specification, Step (C) may be carried out by mixing a solution including rod-shaped molybdenum oxide and a solution including a bismuth precursor, and then adding dropwise water thereto, and in Step (C), there is an effect in that the solution including rod-shaped molybdenum oxide and the solution including the bismuth precursor are mixed, and then water is added dropwise thereto to dissociate the surface of the rod-shaped molybdenum oxide ($MoO_3 + H_2O \rightarrow MoO_4^{2-} + 2H^+$) and facilitate the permeation of the bismuth precursor into the rod-shaped molybdenum oxide.

According to an exemplary embodiment of the present specification, a) the solution including the bismuth precursor used in Step (C) has a content ratio of the bismuth precursor (mg) to ethanol (ml) in a range of 7:1 to 10:1, and preferably 7.03:1 to 9.38:1.

According to an exemplary embodiment of the present specification, b) the solution including rod-shaped molybdenum oxide used in Step (C) has a content ratio of rod-shaped molybdenum oxide (mg) to ethanol (ml) of 23.98:1.

According to an exemplary embodiment of the present specification, in Step (C), the mass ratio of the content of the bismuth precursor in a) the solution including the bismuth precursor to the content of the rod-shaped molybdenum oxide in b) the solution including rod-shaped molybdenum oxide may be in a range of 1:2 to 1:5, preferably in a range of 1:2 to 1:4, and more preferably in a range of 1:2.55 to 1:3.41.

According to an exemplary embodiment of the present specification, in Step (C), when the mass ratio of the content of the bismuth precursor in a) the solution including the bismuth precursor to the content of the rod-shaped molybdenum oxide in b) the solution including rod-shaped molybdenum oxide is 1:2.55 or more, there is an effect in that the amount of bismuth precursor permeating into the rod-shaped molybdenum oxide is sufficiently secured, so that a sufficient number of bismuth molybdate islands grown on the rod-shaped molybdenum oxide after firing may be formed, and each island is distributed at a regular interval.

According to an exemplary embodiment of the present specification, in Step (C), when the mass ratio of the content of the bismuth precursor in a) the solution including the bismuth precursor to the content of the rod-shaped molybdenum oxide in b) the solution including rod-shaped molybdenum oxide is 1:3.41 or less, there is an effect in that the amount of bismuth precursor permeating into the surface of the rod-shaped molybdenum oxide is extremely large, so that bismuth molybdate islands on the rod-shaped molybdenum oxide are distributed at an irregular interval, and thus it is possible to prevent bismuth molybdate, which has not been grown, from being formed.

According to an exemplary embodiment of the present specification, the rate of adding dropwise water in Step (C) is in a range of 4 ml/min to 5 ml/min.

According to an exemplary embodiment of the present specification, when the rate of adding dropwise the solvent is in a range of 4 ml/min to 5 ml/min, bismuth ions ($Bi^{3+}$) of the bismuth precursor activate the uniform adsorption on the surface of rod-shaped molybdenum oxide.

According to an exemplary embodiment of the present specification, the preparation method for the molybdenum oxide composite may include, after Step (C), step (D) separating the molybdenum oxide composite prepared by the preparation method.

According to an exemplary embodiment of the present specification, the separating of the molybdenum oxide composite may be carried out through a centrifuge.

Further, according to an exemplary embodiment of the present specification, the preparation method may include drying and/or firing during or after (D) the separating of the molybdenum oxide composite.

According to an exemplary embodiment of the present specification, the drying may be carried out in a vacuum oven.

According to an exemplary embodiment of the present specification, the firing may be carried out by warming the composite from normal temperature to 420° C. under the air atmosphere, and then maintaining the composite under the air atmosphere for 8 hours.

Another exemplary embodiment of the present specification provides a molybdenum oxide composite prepared by the preparation method for a molybdenum oxide composite.

In the present specification, the molybdenum oxide is an oxidized form of molybdenum (Mo), includes various structures, and includes $MoO_3$.

In the present specification, the rod-shape may be used as a general geometrical meaning, and includes a form in which the size of one axis is larger than that of another axis as an elongated form.

In the present specification, hereinafter, the longest particle diameter and the shortest particle diameter of the rod-shaped molybdenum oxide will be referred to as the length and the thickness, respectively.

According to an exemplary embodiment of the present specification, the rod-shaped molybdenum oxide has a length in a range of 500 nm to 4 μm, and more preferably in a range of 1.5 μm to 2.5 μm.

By Step (A); and Step (B) according to an exemplary embodiment of the present specification, it is possible to prepare rod-shaped molybdenum oxide having a smaller size than in the related art. Specifically, when the rod-shaped molybdenum oxide is prepared by the preparation method according to an exemplary embodiment of the present specification, there is an advantage in that rod-shaped molybdenum oxide having a smaller size may be prepared for the same reaction time as compared to the case in which the rod-shaped molybdenum oxide is prepared by the hydrothermal synthesis method through the one-step in the related art.

The rod-shaped molybdenum oxide according to an exemplary embodiment of the present specification has a smaller size than in the related art, and thus has a relatively higher specific surface area, so that there is an effect in that a catalyst including the rod-shaped molybdenum oxide exhibits a higher activity.

According to an exemplary embodiment of the present specification, the length of the rod-shaped molybdenum oxide is a result of a reaction of $MoO_2(OH)(OOH)$ powder and a water solvent (total pressure: 13.59 atm), and in the Experimental Examples of the present invention, starting from a thickness in a range of 100 nm to 300 nm, most of the rod-shaped molybdenum oxides were grown to a rod-shape having a length of several μm.

In contrast, in the case of molybdenum oxide prepared from the existing hydrogen peroxide solution (J. Phys. Chem. C, (2007) 111, 2401), it was confirmed that when 1.44 g of a plate-like molybdenum oxide powder and 11 ml of 30% $H_2O_2$ were put into a 100-ml hydrothermal synthesis container under a condition of 170° C. and reacted for 20 hours, the rod-shaped molybdenum oxide was grown to a range of more than 4 μm and less than 7.5 μm in a range of 250 nm in thickness. However, the existing preparation method for rod-shaped molybdenum oxide was carried out under a high-pressure hydrothermal synthesis condition (total 58.76 atm).

According to an exemplary embodiment of the present specification, the rod-shaped molybdenum oxide has a thickness in a range of 100 nm to 300 nm.

According to an exemplary embodiment of the present specification, the rod-shaped molybdenum oxide has a thickness of 250 nm or less, and a rod-shaped molybdenum oxide having a thickness of 250 nm is mostly abundantly distributed.

According to an exemplary embodiment of the present specification, when the rod-shaped molybdenum oxide has a length in a range of 500 nm to 4 μm and a thickness in a range of 100 nm to 300 nm, the rod-shaped molybdenum oxide may have a large specific surface area, and a catalyst including a molybdenum oxide having a large specific surface area as described above may secure a much larger contact area than the existing molybdenum oxide having a low specific surface area, and thus exhibit an excellent effect.

According to an exemplary embodiment of the present specification, the ratio of length to thickness of the rod-shaped molybdenum oxide prepared through the two-step reaction is 5:1 to 13:1, and more preferably 6:1 to 10:1. When the ratio of length to thickness of the rod-shaped molybdenum oxide is 5:1 or more, there is an effect in that it is possible to produce more molybdenum oxides at the same weight compared to the case where the ratio is less than 5:1, and the specific surface area is increased.

An exemplary embodiment of the present specification provides a molybdenum oxide composite prepared by the preparation method for a molybdenum oxide composite.

According to an exemplary embodiment of the present specification, the bismuth molybdate island is a form containing bismuth and molybdenum and is not particularly limited, but preferably, includes a material represented by $Bi_2Mo_3O_{12}$.

According to an exemplary embodiment of the present specification, in the composite, the number of particles of rod-shaped molybdenum oxides per 1 ea of the island particle is in a range of 10 to 40, and more preferably in a range of 20 to 25.

According to an exemplary embodiment of the present specification, the mass ratio of Bi to Mo in the composite is in a range of 1:3 to 1:7, and more preferably in a range of 1:3.17 to 1:6.69.

According to an exemplary embodiment of the present specification, when the mass ratio of Bi to Mo in the composite is in the range, bismuth molybdate islands may be distributed at a regular interval on the surface of the rod-shaped molybdenum oxide, and when the mass ratio is out of the range, there is a disadvantage in that the islands exhibit an irregular distribution or the islands are distributed in a small amount on the surface of the rod-shaped molybdenum oxide.

For example, in the Experimental Examples according to the present invention, the mass ratio of bismuth (Bi) to molybdenum (Mo) in the composite was shown through an ICP analysis result and a theoretical calculation.

According to an exemplary embodiment of the present specification, the ratio of the numbers of bismuth and molybdenum particles in the composite is in a range of 1:11 to 1:25, and preferably in a range of 1:23 to 1:25. That is, when the ratio of bismuth and molybdenum is 1:23 to 1:25 or less, there is an effect in that islands having a size in a range of 20 nm to 50 nm exhibit a relatively uniform size distribution.

According to an exemplary embodiment of the present specification, when the ratio of bismuth and molybdenum is 1:11 or more, there is an effect in that the size of islands on the rod-shaped molybdenum oxide is increased in a range of 30 nm to 150 nm, and when the ratio is 1:25 or less, there is an effect in that the number of islands on the rod-shaped molybdenum oxide is small, and thus the distribution is widened.

According to an exemplary embodiment of the present specification, the size of $Bi_2Mo_3O_{12}$ islands in the composite of the metal and molybdenum oxide is in a range of 20 nm to 150 nm, and more preferably 20 nm to 50 nm.

According to an exemplary embodiment of the present specification, most of the islands are present in a rectangular form, the size of the islands was measured based on the shortest length, and the size of approximately 50 islands was measured based on the SEM images in FIG. 8.

In the Experimental Examples of the present invention, the additional SEM analysis result of measuring the size of bismuth molybdate islands in the composite is illustrated in FIG. 9, and when FIG. 9(b) is observed, it can be confirmed that the size of islands is in a range of 20 nm to 150 nm.

According to an exemplary embodiment of the present specification, the composite has a specific surface area in a range of 8.3 to 12 $m^2/g$, and more preferably 9 to 12 $m^2/g$.

According to the Experimental Examples of the present invention, since the bismuth molybdate powder ($Bi_2Mo_3O_{12}$) used in the related art has a specific surface area of 2.37 $m^2/g$, the composite according to the present invention has a higher specific surface area, and thus the high reactivity may be expected. That is, according to the Experimental Examples of the present invention, the composite exhibits a specific surface area of 11.11 $m^2/g$, which is about 4.7 times than the existing bismuth molybdate powder.

Further, the present invention has a higher specific surface area than a composite (8.8 $m^2/g$) including bismuth molybdate in a range of 20 to 40 nm, provided on a molybdenum oxide nanobelt which is the related art.

Another exemplary embodiment of the present specification provides a catalyst including the composite of the metal and the molybdenum oxide.

According to an exemplary embodiment of the present specification, the composite widens the reaction area as a catalyst to improve the reactivity.

According to an exemplary embodiment of the present specification, the catalyst is a material which is involved in a chemical reaction to change the reaction rate, but the catalyst itself remains constant before and after the reaction. That is, in order that the chemical reaction may be carried out, the reaction material needs to go through an activation state, and since the activation state is a state in which the energy is higher than the reaction material or the production material, the reaction material needs to have sufficient energy in order that the reaction may occur. The catalyst causes the reaction material to initiate a reaction through a route which is higher or lower than the activation energy.

According to an exemplary embodiment of the present specification, the composite of the metal and the molybdenum oxide may be used as a catalyst of a partial oxidation reaction.

According to an exemplary embodiment of the present specification, the rod-shaped molybdenum oxide may be used as a catalyst for various partial oxidation reactions, and as an example, may be used as a catalyst for a partial oxidation reaction which produces 1,3-butadiene from 1-butene.

MODE FOR INVENTION

Hereinafter, the present invention will be described in detail with reference to the Examples for specifically describing the present invention. However, the Examples according to the present invention may be modified in various forms, and the scope of the present invention is not limited to the Examples to be described in detail below. The Examples of the present invention are provided for more completely explaining the present invention to the person with ordinary skill in the art.

Example 1-1 Step (A)

43.2 g (0.3 mol) of a plate-like molybdenum oxide powder was put into 66 ml of a 30% hydrogen peroxide solution, and the resulting mixture was stirred for 1 hour under a normal temperature condition of 20° C. to 30° C., and then warmed at a rate of 5° C./min. The mixture was maintained at 65° C. for 30 minutes to confirm oxygen dissociated from an excessive amount of hydrogen peroxide, and it was confirmed that the amount of oxygen had been decreased, and then the mixture was warmed at a rate of 5° C./min until 95° C. In a range of 80° C. to 95° C., the solution turned dark yellow, and the solution was maintained at 95° C. for 2 hours, and then cooled to normal temperature. An $MoO_2(OH)(OOH)$ solution formed by the process was separated as a sample through a centrifuge, and the separated sample was dried at 80° C. in a vacuum oven. Through the process, it was confirmed that 40 g of $MoO_2(OH)(OOH)$ was produced, and a high yield of approximately 92.6% compared to the amount of plate-like molybdenum oxide introduced was exhibited.

Example 1-2 Step (B)

7.12 g (0.04 mol) of the $MoO_2(OH)(OOH)$ powder prepared through Example 1-1 was put into 25 ml of water, the resulting mixture was stirred for 1 hour, and then the solution was put into a 100 ml hydrothermal synthesis container. Moreover, the container was put into an oven at an internal temperature of 160° C. and maintained for 20 hours, and a water pressure ($H_2O$) of 6.06 atm and an oxygen pressure of 7 to 8 atm were generated during the process.

Rod-shaped molybdenum oxide, which is a product formed through the process, was cooled to normal temperature, was separated through centrifugation, and the separated sample was dried at 80° C. in a vacuum oven to obtain rod-shaped molybdenum oxide having a length of usually 1.5 μm to 2.5 μm.

As an experimental result in the Example, an SEM analysis result is illustrated in FIG. 1. FIG. 1(a) illustrates the shape of a commercially available plate-like molybdenum oxide powder which is a reactant in Step (A), FIG. 1(b) illustrates the shape of $MoO_2(OH)(OOH)$ which is a reaction product in Step (A), and FIG. 1(c) illustrates the shape of rod-shaped molybdenum oxide which is a reaction product in Step (B).

Further, FIG. 2 illustrates an XRD analysis result of $MoO_2(OH)(OOH)$ which is a reaction product in Step (A), and FIG. 3 illustrates an XRD analysis result of rod-shaped molybdenum oxide which is a reaction product in Step (B).

FIG. 4 illustrates SEM and XRD analysis results of $MoO_3 \cdot xH_2O$ which is an intermediate product produced when Step (B) in which rod-shaped molybdenum oxide is prepared from $MoO_2(OH)(OOH)$ is carried out at 100° C., and x is a value of 0 to 1.

FIG. 5 illustrates SEM and XRD analysis results of rod-shaped molybdenum oxide produced when Step (B) in which rod-shaped molybdenum oxide is prepared from $MoO_2(OH)(OOH)$ is carried out at 130° C.

FIG. 6(a) illustrates a BET analysis result showing the specific surface area of a commercially available $MoO_3$ powder, and FIGS. 6(b) and 6(c) illustrate BET analysis results showing the specific surface areas of rod-shaped molybdenum oxide according to the present invention.

Comparative Example 1-1

43.2 g (0.3 mol) of a plate-like molybdenum oxide powder was put into 66 ml of a 30% hydrogen peroxide solution, and the resulting mixture was stirred under a condition of 2° C. for 7 days. An $MoO_2(OH)(OOH)$ solution formed by the process was separated as a sample through a centrifuge, and the separated sample was dried at 80° C. in a vacuum oven. Through the process, it was confirmed that approximately 1.2 g of $MoO_2(OH)(OOH)$ was produced, and a low yield of approximately 2.78% compared to the amount of plate-like molybdenum oxide introduced was exhibited.

Comparative Example 1-2

43.2 g (0.3 mol) of a plate-like molybdenum oxide powder was put into 66 ml of a 30% hydrogen peroxide solution, and the resulting mixture was stirred under a condition of 30° C. for 7 days. An $MoO_2(OH)(OOH)$ solution formed by the process was separated as a sample through a centrifuge, and the separated sample was dried at 80° C. in a vacuum oven. It was confirmed that approximately 23.2 g of $MoO_2(OH)(OOH)$ was produced, and a low yield of approximately 53.7% compared to the amount of plate-like molybdenum oxide introduced was exhibited.

Comparative Example 1-3

According to a one-step preparation method for rod-shaped molybdenum oxide using hydrogen peroxide in the related art, molybdenum oxide was prepared. 1.44 g of a plate-like molybdenum oxide ($MoO_3$) powder was put into 11 ml of a 30% hydrogen peroxide solution, and the resulting mixture was stirred at 30° C. for 6 hours, and then diluted in DI water or 2 mol/ml of a nitric acid solution. Moreover, a 50% to 60% space in a hydrothermal synthesis container was filled, and then the reaction was carried out at 170° C. for 20 hours. As a result of the experiment, it was exhibited that rod-shaped molybdenum oxide was grown in a range of more than 4.5 μm and less than 7 μm in a range of 250 nm in thickness.

Comparative Example 1-4

According to a one-step preparation method for rod-shaped molybdenum oxide using hydrogen peroxide in the related art, molybdenum oxide was prepared. 4.32 g of a plate-like molybdenum powder was put into 66 ml of a 30% hydrogen peroxide solution, the resulting mixture was stirred at 30° C., and then a 60% to 70% space in a hydrothermal synthesis container was filled, and then the reaction was carried out at 180° C. for 24 hours. The prepared rod-shaped molybdenum oxide (molybdenum oxide nanobelt) exhibited a specific surface area of 8.8 $m^2/g$, and thus it can be seen that the specific area was lower than the range (9 to 12 $m^2/g$, see FIG. 6) of the specific surface area of the rod-shaped molybdenum oxide of the present invention.

Experimental Example 1-1

The rod-shaped molybdenum oxide was used as a catalyst of a partial oxidation reaction to prepare 1,3-butadiene from 1-butene, and the experimental process is specifically as follows.

3.0 g of the rod-shaped molybdenum oxide powder prepared through the Example was made into pellets by using a hydraulic press machine and a pelletizer, and the pellets were split in sieves having a size of 1,180 μm and a size of 600 μm to prepare a sample having a size of 600 μm to 1,180 μm. The sample was put into a high through-put system (HTS) reactor and the sample was warmed to 400° C. to perform a pre-treatment for 1 hour under gas conditions of $N_2$: 28.6 sccm, $O_2$: 28.6 sccm, steam: 28.6 sccm, and then cooled to 320° C. to carry out the reaction under gas conditions of $N_2$: 30 sccm, $O_2$: 2.5 sccm, steam: 10 sccm, and 1-butene: 2.5 sccm.

Through the experiment, the rod-shaped molybdenum oxide was used as a catalyst of a partial oxidation reaction ($C_4H_8+O_2 \rightarrow C_4H_6+H_2O$) of forming 1, 3-butadiene from 1-butene, and thus the reaction product 1,3-butadiene was detected through chromatography and could be confirmed.

Experimental Example 1-2

The example, in which the rod-shaped molybdenum oxide was used as a catalyst support, was as follows, and a composite including rod-shaped molybdenum oxide and crystalline $Fe_2Mo_3O_{12}$ islands provided on the rod-shaped molybdenum oxide was prepared.

300 mg of $Fe(NO_3)_3 \cdot 9H_2O$ was put into 50 ml of water, and the mixture was stirred at a normal temperature. Meanwhile, 225 mg of the prepared rod-shaped molybdenum oxide was put into 50 ml of water, and the mixture was warmed to a temperature of 50° C. and stirred. An iron precursor ($Fe(NO_3)_3 \cdot 5H_2O$) solution was added dropwise to the rod-shaped molybdenum oxide solution at a rate of 4 ml/min to 5 ml/min, and then the mixture was stirred and maintained for 2 hours. And then, a centrifuge was used to separate a rod-shaped molybdenum oxide sample into which the iron precursor was inserted, and the sample was dried at 80° C. in a vacuum oven. The dried sample was fired in the air at a temperature of 500° C. for 4 hours. Through the experimental results (SEM and XRD), it could be seen that crystalline $Fe_2Mo_3O_{12}$ islands having a size of 80 to 200 nm were formed on the prepared rod-shaped molybdenum oxide. Further, through the XRD analysis, it could be confirmed that the prepared rod-shaped molybdenum oxide and an $Fe_2Mo_3O_{12}$ island phase were present.

The SEM analysis result according to the experimental result is illustrated in FIG. 7(a), and the XRD analysis result is illustrated in FIG. 7(b).

Example 2-1

Preparation of Composite 425.85 mg (3.6 mmol) of $Bi(NO_3)_3 \cdot 5H_2O$ was put into 45 ml of an ethanol solution, 9 ml of glycerol was additionally put into the ethanol solution in order that the mixture might be dissolved in the ethanol solution, and then the resulting mixture was warmed to a temperature of 40° C. to 60° C. and stirred. Meanwhile, 1,295 g of rod-shaped molybdenum oxide ($MoO_3$ rod, 9 mmol) was put into 54 ml of an ethanol solution, and the resulting mixture warmed to a temperature of 70° C. and stirred. The bismuth precursor solution was put into the molybdenum oxide solution and the resulting mixture was stirred, and then 15 ml of water was added dropwise to the solution at a rate of 4 ml/min to 5 ml/min. After the mixture was stirred for 2 hours, a centrifuge was used to separate a composite of bismuth and molybdenum oxide, and the composite was dried at 80° C. in a vacuum oven. The dried sample was fired in the air at a temperature of 420° C. for 8 hours.

The experimental results according to Example 2-1 are illustrated in FIGS. 8 to 12 and 14.

FIGS. 8 and 9 illustrate SEM analysis results of a composite including rod-shaped molybdenum oxide and bismuth molybdate ($Bi_2Mo_3O_{12}$) islands provided on the rod-shaped molybdenum oxide.

FIG. 10 is a TEM analysis result of a composite including rod-shaped molybdenum oxide and bismuth molybdate ($Bi_2Mo_3O_{12}$) islands provided on the rod-shaped molybdenum oxide, and Point 1 illustrates rod-shaped molybdenum oxide and Point 2 illustrates bismuth molybdate ($Bi_2Mo_3O_{12}$) islands.

FIG. 11 illustrates an XRD analysis result of a composite including rod-shaped molybdenum oxide and bismuth molybdate ($Bi_2Mo_3O_{12}$) islands provided on the rod-shaped molybdenum oxide.

FIGS. 12(a) illustrates BET analysis results of a composite including rod-shaped molybdenum oxide and bismuth molybdate ($Bi_2Mo_3O_{12}$) islands provided on the rod-shaped molybdenum oxide.

FIG. 14 illustrates an ICP analysis result of a composite including rod-shaped molybdenum oxide and bismuth molybdate ($Bi_2Mo_3O_{12}$) islands provided on the rod-shaped molybdenum oxide, and equations of calculating the ratio of molybdenum oxide and bismuth molybdate ($Bi_2Mo_3O_{12}$) particles.

Comparative Example 2-1

12.1 g of $Bi(NO_3)_3 \cdot 5H_2O$ (24.9 mmol) was put into 45 ml of a DI water solution, 4.5 ml of nitric acid was additionally put into the solution in order to dissolve $Bi(NO_3)_3 \cdot 5H_2O$, and then the resulting solution was warmed to a temperature of 40° C. and stirred. Meanwhile, 6.6 g of $(NH_4)_6Mo_7O_{24} \cdot 4H_2O$ (5.3 mmol) was put into 50 ml of a DI water solution, and the resulting mixture was stirred at a normal temperature (20° C. to 30° C.). The bismuth precursor ($Bi(NO_3)_3 \cdot 5H_2O$) solution was added dropwise to a molybdenum precursor ($(NH_4)_6 Mo_7O_{24} \cdot 4H_2O$) solution at a rate of 4 ml/min to 5 ml/min. After the solution was stirred for 2 hours, a centrifuge was used to separate a $Bi_2Mo_3O_{12}$ powder, and the powder was dried at 80° C. in a vacuum oven. The dried sample was fired in the air at a temperature of 500° C. for 8 hours.

FIG. 12(b) illustrates a BET analysis result of the $Bi_2Mo_3O_{12}$ powder, and FIG. 13 illustrates an SEM analysis result of the $Bi_2Mo_3O_{12}$ powder.

Comparative Example 2-2

395 mg of $Bi(NO_3)_3$ (2 mmol) was dissolved in 10 ml of glycerol at a temperature of 60° C. 1,439.6 mg (10 mmol) of a molybdenum oxide nanobelt ($MoO_3$ nanobelt) and 330 ml of an ethanol solution was put into a $Bi(NO_3)_3$ solution and stirred. The resulting mixture was warmed to a temperature of 80° C., and then 50 ml of water was added dropwise thereto at a rate of 0.01 ml/min. After the solution was stirred for 24 hours, a centrifuge was used to separate a composite of bismuth and molybdenum oxide, and the composite was dried at 40° C. in a vacuum oven. The dried sample was fired in the air at a temperature of 420° C. As a result of the experiment, $Bi_2Mo_3O_{12}$ islands having a size of 20 nm to 40 nm were uniformly formed on the molybdenum oxide nanobelt. In the experiment, it can be seen that 33 ml of an ethanol solvent was used per 1 mmol of the molybdenum oxide nanobelt and the experiment was carried out at a temperature which is equivalent to or more than the boiling point (a temperature of 80° C.) of the ethanol solution.

Experimental Example 2-1

The prepared composite including rod-shaped molybdenum oxide and bismuth molybdate ($Bi_2Mo_3O_{12}$) islands provided on the rod-shaped molybdenum oxide was used as a catalyst of a partial oxidation reaction in a reaction of preparing 1,3-butadiene from 1-butene, and the experimental process is specifically as follows.

3.0 g of a composite powder prepared through the Example including the rod-shaped molybdenum oxide and bismuth molybdate ($Bi_2Mo_3O_{12}$) islands provided on the rod-shaped molybdenum oxide was made into pellets by using a hydraulic press machine and a pelletizer, and the pellets were split in sieves having a size of 1,180 μm and a size of 600 μm to prepare samples having a size of 600 μm to 1,180 μm.

1.5 g of the sample was put into a high through-put system (HTS) reactor and the resulting mixture was warmed from normal temperature to 400° C. under gas conditions of $N_2$: 28.6 sccm and $O_2$: 7.14 sccm, and then a pre-treatment was carried out for 1 hour. The mixture was cooled to 320° C. and steam: 10 sccm was actuated and maintained for 30 minutes. The reaction was carried out for 30 minutes under a gas condition of $N_2$: 20 sccm, $O_2$: 2.5 sccm, steam: 6.67 sccm, and 1-butene: 1.67 sccm, and then a detection reaction was carried out through gas chromatography.

The bismuth (Bi) molybdate ($Bi_2Mo_3O_{12}$) island composite on rod-shaped molybdenum oxide (rod-shaped $MoO_3$) exhibited a conversion rate of 41.4%, a 1,3-butadiene (BD) selectivity of 15.55%, and a 1,3-butadiene (BD) yield of 6.44%, and the 1,3-butadiene (BD) yield of the bismuth (Bi) molybdate ($Bi_2Mo_3O_{12}$) islands exhibited 3.12%, except for the yield of the rod-shaped molybdenum oxide (rod-shaped $MoO_3$) itself (a conversion rate of 39.1%, a 1,3-butadiene (BD) selectivity of 8.51%, and a 1,3-butadiene (BD) yield of 3.32%). Since the ratio of bismuth (Bi) molybdate ($Bi_2Mo_3O_{12}$) islands of the composite is composed at 20 wt % through the ICP analysis (FIG. 14), the reaction efficiency of bismuth (Bi) molybdate ($Bi_2Mo_3O_{12}$) islands exhibits 3.12%/0.2=15.6%. Through the ICP analysis, it is exhibited that the reaction efficiency is higher than a yield of 1,3-butadiene (BD) of 8.49% of the powder ($Bi_2Mo_3O_{12}$ powder) composed of 100% bismuth molybdate in the Comparative Examples.

Comparative Experimental Example 2-1

The reaction experimental process of preparing 1,3-butadiene from 1-butene in the powder ($Bi_2Mo_3O_{12}$ powder) composed of 100% bismuth molybdate was carried out in the same manner as in the Experimental Examples.

The powder ($Bi_2Mo_3O_{12}$ powder) composed of 100% bismuth molybdate exhibited a conversion rate of 37.3%, a 1,3-butadiene (BD) selectivity of 22.77%, and a 1,3-butadiene (BD) yield of 8.49%.

The invention claimed is:

1. A preparation method for rod-shaped molybdenum oxide, the method comprising:
   (A) mixing a hydrogen peroxide solution and molybdenum oxide powder to form a first mixture, and warming the first mixture from 20° C. to 30° C. to 95° C. or less at a rate of 4° C./min to 5° C./min to form $MoO_2(OH)(OOH)$, followed by separating the $MoO_2(OH)(OOH)$ from the first mixture and drying the $MoO_2(OH)(OOH)$ to form a powder; and
   (B) forming rod-shaped molybdenum oxide from the $MoO_2(OH)(OOH)$ powder through a hydrothermal synthesis method,
   comprising mixing the $MoO_2(OH)(OOH)$ powder from Step (A) with water to form a second mixture and heating the second mixture from normal temperature to a temperature of 130° C. to 160° C.

2. The method of claim 1, wherein Step (A) is carried out under a normal pressure condition.

3. The method of claim 1, wherein Step (B) is carried out under a pressure condition in a range of 10 atm to 20 atm, and an internal pressure in a hydrothermal synthesis container is measured as the pressure.

4. Rod-shaped molybdenum oxide prepared according to claim 1 and having a length in a range of from 1.5 μm to 2.5 μm.

5. A catalyst comprising the rod-shaped molybdenum oxide of claim 4.

6. A catalyst support comprising the rod-shaped molybdenum oxide of claim 4.

7. The method of claim 1, wherein the rod-shaped molybdenum oxide has a length in a range of from 1.5 μm to 2.5 μm.

8. A preparation method for a molybdenum oxide composite, the method comprising:
   (A) mixing a hydrogen peroxide solution and molybdenum oxide powder to form a first mixture and warming the first mixture from 20° C. to 30° C. to 95° C. or less at a rate of 4° C./min to 5° C./min to form $MoO_2(OH)(OOH)$, followed by separating the $MoO_2(OH)(OOH)$ from the first mixture and drying the $MoO_2(OH)(OOH)$ to form a powder;
   (B) forming rod-shaped molybdenum oxide from the $MoO_2(OH)(OOH)$ through a hydrothermal synthesis method,
   comprises comprising mixing the $MoO_2(OH)(OOH)$ powder from Step (A) with water to form a second mixture and heating the second mixture from normal temperature to a temperature of 130° C. to 160° C. to form the rod-shaped molybdenum oxide; and
   (C) mixing the rod-shaped molybdenum oxide and a bismuth precursor to form a composite in which bismuth molybdate islands are provided on the rod-shaped molybdenum oxide.

9. The method of claim 8, wherein the bismuth precursor comprises bismuth nitrate ($Bi(NO_3)_3 \cdot 5H_2O$).

10. The method of claim 8, wherein Step (C) comprises mixing a) a solution comprising rod-shaped molybdenum oxide and b) a solution comprising a bismuth precursor, and then adding water dropwise thereto.

11. The method of claim 10, wherein a) the solution comprising rod-shaped molybdenum oxide comprises a solvent having an OH functional group and glycerol.

12. The method of claim 10, wherein b) the solution comprising the bismuth precursor comprises a solvent having an OH functional group.

13. The method of claim 10, wherein the adding water dropwise thereto is carried out at a rate of 4 ml/min to 5 ml/min.

14. The method of claim 8, wherein Step (C) is carried out at a temperature which is equal to or less than a boiling point of ethanol.

15. The method of claim 8, wherein the method comprises, after Step (C), (D) separating the molybdenum oxide composite.

16. A molybdenum oxide composite prepared according to claim 8.

17. A catalyst comprising the molybdenum oxide composite of claim 16.

* * * * *